(12) United States Patent
Bennett

(10) Patent No.: US 12,088,671 B2
(45) Date of Patent: Sep. 10, 2024

(54) DISTRIBUTED EMISSIONS SENSOR SYSTEM

(71) Applicant: S&P Global Inc., New York, NY (US)

(72) Inventor: Daniel Bennett, St. Paul, MN (US)

(73) Assignee: S&P Global Inc., New York, NY (US)

( * ) Notice: Subject to any disclaimer, the term of this patent is extended or adjusted under 35 U.S.C. 154(b) by 13 days.

(21) Appl. No.: 17/814,457

(22) Filed: Jul. 22, 2022

(65) Prior Publication Data

US 2024/0031437 A1    Jan. 25, 2024

(51) Int. Cl.
| | | |
|---|---|---|
| *H04L 12/70* | (2013.01) |
| *G06F 17/14* | (2006.01) |
| *G06F 17/16* | (2006.01) |
| *H04L 41/0806* | (2022.01) |
| *H04L 67/12* | (2022.01) |
| *H04W 48/08* | (2009.01) |

(52) U.S. Cl.
CPC ............ *H04L 67/12* (2013.01); *G06F 17/141* (2013.01); *G06F 17/16* (2013.01)

(58) Field of Classification Search
CPC ......... H04L 67/12; G06F 17/141; G06F 17/16
USPC .......................................................... 709/224
See application file for complete search history.

(56) References Cited

U.S. PATENT DOCUMENTS

| | | | | |
|---|---|---|---|---|
| 5,598,003 A * | 1/1997 | Jones | .................... | G01T 1/1642 |
| | | | | 250/363.04 |
| 11,313,765 B2 * | 4/2022 | Onekea | .............. | H04N 5/44504 |
| 11,865,594 B2 * | 1/2024 | Quigley | .................. | B09B 1/006 |
| 2010/0125437 A1 * | 5/2010 | Vasseur | .................. | H04L 43/10 |
| | | | | 702/188 |
| 2018/0160299 A1 | 6/2018 | Onishi et al. | | |
| 2018/0313798 A1 * | 11/2018 | Chokshi | .............. | G01N 33/004 |
| 2019/0176862 A1 * | 6/2019 | Kumar | .................... | B61L 27/40 |
| 2019/0281447 A1 | 9/2019 | Onishi et al. | | |
| 2022/0219674 A1 * | 7/2022 | Light-Holets | ......... | B60W 40/00 |
| 2022/0333803 A1 * | 10/2022 | Weibel | .................... | F24F 11/72 |
| 2023/0003705 A1 * | 1/2023 | Peng | .................. | G05B 23/0272 |

(Continued)

FOREIGN PATENT DOCUMENTS

| | | |
|---|---|---|
| CN | 108151789 A | 6/2018 |
| JP | 6515910 B2 | 5/2019 |

(Continued)

OTHER PUBLICATIONS

"BME280 Combined humidity and pressure sensor," Bosch Sensortec, BST-BME280-DS001-10, May 7, 2015, 54 pages.

(Continued)

*Primary Examiner* — Yves Dalencourt
*Assistant Examiner* — Elizabeth Kassa
(74) *Attorney, Agent, or Firm* — Yee & Associates, P.C.

(57) ABSTRACT

A method, apparatus, system, and computer product for monitoring emission data transmitted over a network. A computer system collects emission data received from sensor devices over the network. The computer system compares the emission data to a set of thresholds for the emission data to form a comparison between the emission data and the set of thresholds. The computer system changes a collection of additional emission data from the sensor devices over the network based on the comparison between the emission data and the set of thresholds.

40 Claims, 16 Drawing Sheets

```
        START
          │
          ▼
┌──────────────────────────────────────┐
│ COLLECT, BY THE COMPUTER SYSTEM, A   │
│    LARGER AMOUNT OF DATA FOR THE     │──1200
│   ADDITIONAL EMISSION DATA WHEN      │
│ MAKING MEASUREMENTS OF EMISSIONS     │
└──────────────────────────────────────┘
          │
          ▼
         END
```

(56) References Cited

U.S. PATENT DOCUMENTS

2023/0304982 A1* 9/2023 Eichenlaub ............ G01D 21/02
73/31.02

FOREIGN PATENT DOCUMENTS

| WO | WO-2021066669 A1 * | 4/2021 | ............. F01N 11/00 |
| WO | WO-2023091160 A1 * | 5/2023 | ............ B25J 13/003 |

OTHER PUBLICATIONS

"CCS811 Ultra-Low Power Digital Gas Sensor for Monitoring Indoor Air Quality," AMS Datasheet [v1-00], Dec. 23, 2016, 36 pages.

"Datasheet SPS30 Particulate Matter Sensor for Air Quality Monitoring and Control," Sensirion, Version 1.0—D1, Mar. 2020, 26 pages.

"Particulate Matter Sensor—SPS30," SparkFun, 8 pages, accessed Jul. 20, 2020 https://www.sparkfun.com/products/15103.

"SparkFun Environmental Combo Breakout—CCS811/BME280 (Qwiic)," SparkFun, 13 pages, accessed Jul. 20, 2020, https://www.sparkfun.com/products/14348.

Nyarku et al., "Mobile phones as monitors of personal exposure to air pollution: Is this the future?," PLOS One, Feb. 23, 2018, 18 pages.

* cited by examiner

DISTRIBUTED EMISSIONS SENSOR SYSTEM

BACKGROUND INFORMATION

1. Field

The present disclosure relates generally to improved data processing system and in particular, to a method, apparatus, system, and computer program product for the distributed capture of emission data.

2. Background

With respect to environmental concerns, climate risk, resilience, and disclosure is an emerging issue that organizations are increasingly addressing. More and more entities such as corporations, businesses, and other entities are increasing awareness of emissions and the effect of emissions on climate change in an effort to reach a net zero or carbon neutral state.

For example, businesses are interested in their carbon emissions and how those emissions shape their carbon footprint. The identification of emissions at different locations for business can be used to develop and implement plans to lower those emissions and potentially become carbon negative. Further, this information can be used by an entity to determine whether it is meeting emission goals. This information can also be used to determine how they compare to emission benchmarks with other entities.

Emission reports can be generated using information from different sources. These sources include documents from government agencies, documents from various entities based on government regulations such as those from the Environmental Protection Agency (EPA), state regulatory agencies, and other sources. This information may also be provided government agencies in different countries.

In a fast involving environment, such as climate change, waiting for emission data to become available from these sources can slow the ability of entities in launching or planning new products. Further, depending on the delay in collecting emission information and publishing this data, the published information can be out of date and less useful to an entity in performing actions for products offered or planned by the entity to be more environmentally friendly.

Therefore, it would be desirable to have a method, apparatus, system, and computer program product that take into account at least some of the issues discussed above, as well as other possible issues. For example, it would be desirable to have a method, apparatus, system, and computer program product that overcome a technical problem with acquiring emission data in manner increases at least one of the useability or value of the emission data.

SUMMARY

An embodiment of the present disclosure provides a method that monitors emission data transmitted over a network. A computer system collects emission data received from sensor devices over the network. The computer system compares the emission data to a set of thresholds for the emission data to form a comparison between the emission data and the set of thresholds. The computer system changes a collection of additional emission data from the sensor devices over the network based on the comparison between the emission data and the set of thresholds.

In another embodiment of the present disclosure a method monitors emission data. A computer system collects emission data transmitted over a network by a number of sensor devices, wherein the emission data comprises measurements for a set of emission parameters and location data. The computer system compares the emission data to a policy for collecting the emission data to form a comparison between the emission data and the policy. The computer system performs a set of actions using the comparison between the emission data and the policy.

In yet another embodiment of the present disclosure, an emission data collection system comprises a computer system and a data acquisition manager in the computer system. The data acquisition manager collects emission data received from sensor devices over a network. The data acquisition manager compares the emission data to a set of thresholds for the emission data to form a comparison between the emission data and the set of thresholds. The data acquisition manager changes a collection of additional emission data from the sensor devices over the network based on the comparison between the emission data and the set of thresholds.

In still another embodiment of the present disclosure, an emission data collection system comprises a computer system and a data acquisition manager in the computer system. The data acquisition manger collects emission data transmitted over a network, wherein the emission data comprises measurements for a set of emission parameters and locations. The data acquisition manager compares the emission data collected to a policy for collecting the emission data to form a comparison between the emission data and the policy. The data acquisition manager performs a set of actions using the comparison between the emission data and the policy.

In yet another embodiment of the present disclosure, a computer program product monitors emission data. The computer program product comprises a computer-readable storage medium having program instructions embodied therewith. The program instructions are executable by a computer system to cause the computer system to perform a method that: collects emission data received from sensor devices over a network, wherein the emission data comprises measurements for a set of emission parameters and location data; compares the emission data to a set of thresholds for the emission data to form a comparison between the emission data and the set of thresholds; and changes a collection of additional emission data from the sensor devices over the network based on the comparison between the emission data and the set of thresholds.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
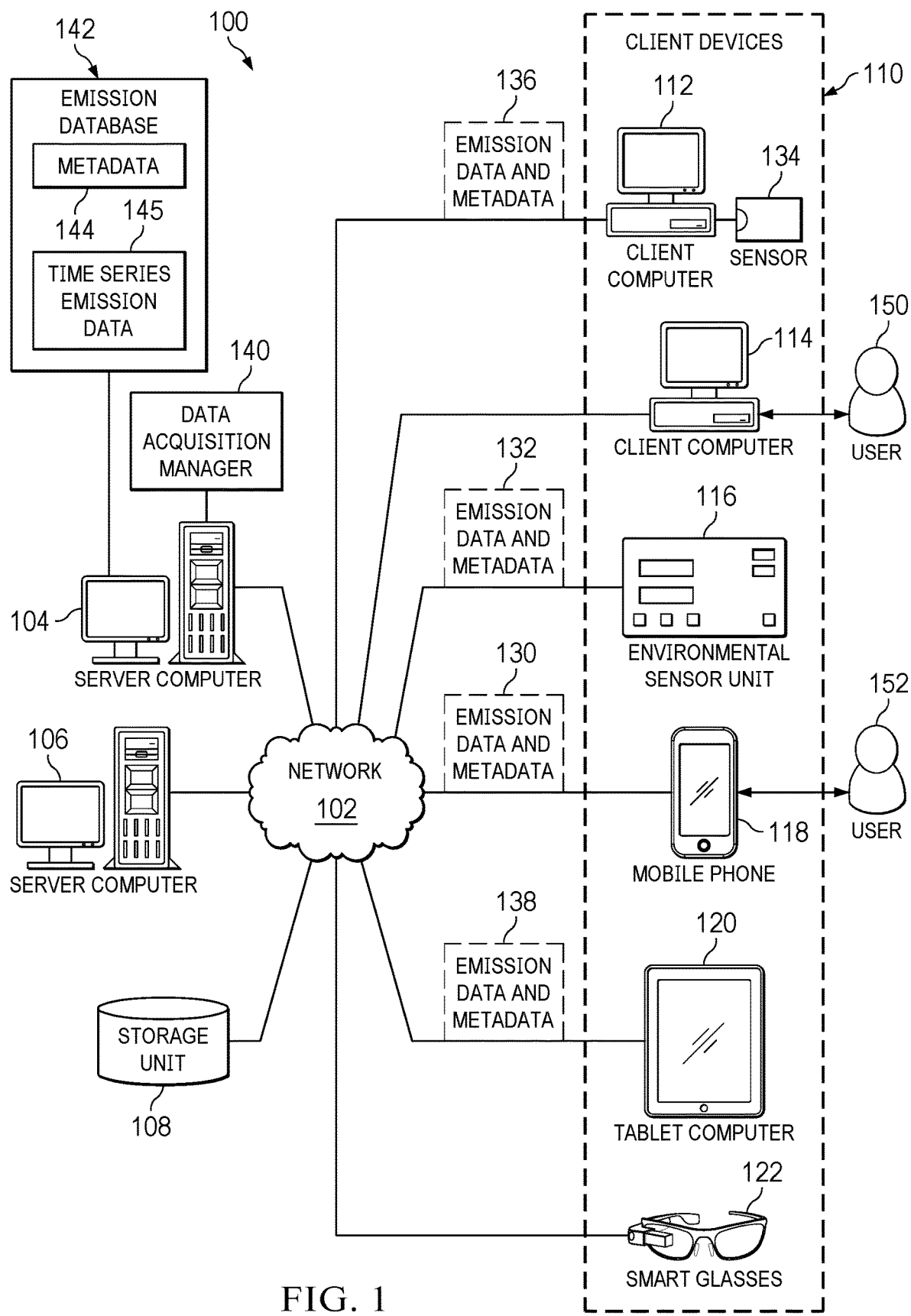
FIG. 1 is a pictorial representation of a network of data processing systems in accordance with an illustrative embodiment.

The illustrative embodiments recognize and take into account one or more different considerations as described below. For example, the illustrative examples recognize and take into account that inefficiencies can be present when collecting sensor data. The illustrative embodiments recognize and take into account that having all available sensor devices generate and send sensor data inefficient. For example, the use of network resources increases with having all sensor devices send sensor data as compared to using fewer sensor devices. The illustrative embodiments also recognize and take account that is not always necessary to have every sensor device in an area send sensor data.

For example, the illustrative embodiments recognize and take into account that a portion of the sensors in an area can be used to send sensor data while other sensors in the same area do not send sensor data. The illustrative embodiments recognize and take into account that the amount of sensor data needed can change in response to the environmental conditions measured by the sensor data. When emissions are measured, a change in levels of particular emissions can change the amount of sensor data that may be needed. For example, when measuring emissions in the form of volatile organic compounds, as the level of these compounds increases, the amount of sensor data measuring volatile organic compounds may also increase. For example, a threshold for volatile organic compounds can be used to determine when a level is unacceptable with respect to various regulations. When this threshold is crossed, additional sensor data for measurements of volatile organic compounds can be collected to increase the precision in the sensor data. When levels are below the threshold, less sensor data is collected. As result, the amount sensor data collected, the frequency of collecting sensor data, or both can be changed.

Further, an issue is present in which sensor data from a sensor device can be inaccurate. In the illustrative examples, a threshold can also indicate when sensor data is unreliable, resulting in a need to collect sensor data from additional sensor devices in an effort to obtain reliable sensor data.

This type of adaptive data collection can be used in place of collecting data from all sensor devices all of the time. In this manner, the use of network resources as well as sensor device resources can be reduced. This example can take into account sensors being offline when collecting data.

Additionally, when large amounts of sensor data are received, processing the large amounts of sensor data can use more processor resources in a computer system than desired. In the illustrative examples, the amount of sensor data being processed can vary depending on the results of an analyzing the received sensor data. Thresholds can be used to indicate when more sensor data or less sensor data should be processed. In this manner, processing resources in the computer system can be reduced when less sensor data needs to be processed.

In the illustrative examples, the processing of sensor data to determine whether changes in how sensor data is collected can be performed as sensor data is received. In other words, the processes can be performed in real time in which the sensor data is processed as quickly as possible without potential delays.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables. In some examples, network 102 can be a wireless network.

In the depicted example, server computer 104 and server computer 106 connect to network 102 along with storage unit 108. In addition, client devices 110 connect to network 102. As depicted, client devices 110 include client computer 112 and client computer 114. Client devices 110 can be, for example, computers, workstations, or network computers. In the depicted example, server computer 104 provides information, such as boot files, operating system images, and applications to client devices 110. Further, client devices 110 can also include other types of client devices such as environmental sensor unit 116, mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage medium and downloaded to a data processing system or other device for use. For example, program instructions can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, one or more of client devices 110 can be configured to detect emission data. For example, mobile phone 118 can include hardware or can be connected to at least one hardware sensors that detect various parameters about the environment around mobile phone 118. For example, mobile phone 118 can detect parameters such as humidity, temperature, ambient pressure, illuminance, and other parameters.

These capabilities to detect parameters about the environment can be integrated in the hardware for mobile phone 118. In other illustrative examples, the hardware module or unit can be connected to mobile phone 118 to detecting these and other parameters about the environment.

In this example, mobile phone 118 is a mobile sensor device and can generate emission data and metadata 130 based on the parameters about the environment detected by mobile phone 118. In this illustrative example, the metadata in emission data and metadata 130 can include timestamps, location data, and other information. The location can be identified using a global positioning system (GPS) receiver in mobile phone 118. Mobile phone 118 can transmit emission data and metadata 130 over network 102 to data acquisition manager 140 located on server computer 104. In this illustrative example, data acquisition manager 140 can be operated by an independent organization monitoring emissions, a company generating emissions, or some other entity.

As another example, environmental sensor unit 116 is a hardware unit and can be a mobile sensor device. For example, environmental sensor unit 116 can be carried by a vehicle or a person.

In this example, environmental sensor unit 116 can detect various parameters about the environment around environmental sensor unit 116 and generates emission data and metadata 132. Environmental sensor unit 116 can transmit emission data and metadata 132 to data acquisition manager 140 over network 102.

As depicted, environmental sensor unit 116 can take a number of different forms. For example, environmental sensor unit 116 can be include a single board computer (SBC) and an environmental sensor. The single board computer can be a Raspberry Pi Pico board, and the environmental sensor can be a particulate matter sensor. This unit can also include a global positioning system (GPS) to determine the location of environmental sensor unit 116. In this example, environmental sensor unit 116 is a wireless device using a wireless connection to connect to network 102. The particulate matter sensor can be in optical particle sensor using laser scattering and contamination resistance technology to measure particles in the environment. These particles can include gases such as ozone (O3), nitrogen dioxide (NO2) sulfur dioxide (SO2) and other types of gases of interest for detecting pollution.

In yet another illustrative example, sensor 134 can be connected to client computer 112. Sensor 134 can also detect various parameters for the environment around client computer 112. In this example, client computer 112 can generate emission data and metadata 136 and transmit emission data and metadata 136 to data acquisition manager 140 over network 102.

As yet another example, tablet computer 120 is an example of a mobile sensor device that can generate emission data and metadata 138 and send emission data and metadata 138 to data acquisition manager 140 over network 102. Tablet computer 120 can generate emission data and metadata 138

Data acquisition manager 140 collects emission data with associated metadata from various ones of client devices 110. This collected data is processed and stored in emission database 142 in the form of time series emission data 145 and metadata 144. In these illustrative examples, time series data is timestamp data in which the sensor data is indexed in time order. Further, the locations in the metadata can be used to correlate the emission data to the locations of physical infrastructures such as a manufacturing facility or a power plant.

In this illustrative example, user 150 at client computer 114 can access time series emission data 145 and metadata 144. For example, user 150 may access time series emission data 145 for one or more physical infrastructures. In this depicted example, the access can be on a subscription basis. This information can be used to determine benchmarks, generate required regulatory reports, and other purposes.

Additionally, users who register and submit emission data can also be provided access to emission database 142. For example, data acquisition manager 140 can enable user 152 of mobile phone 118 to access emission database 142. This access can be granted to user 152 without needing a paid subscription as an incentive to submit emission data and metadata 130.

Figure 2:
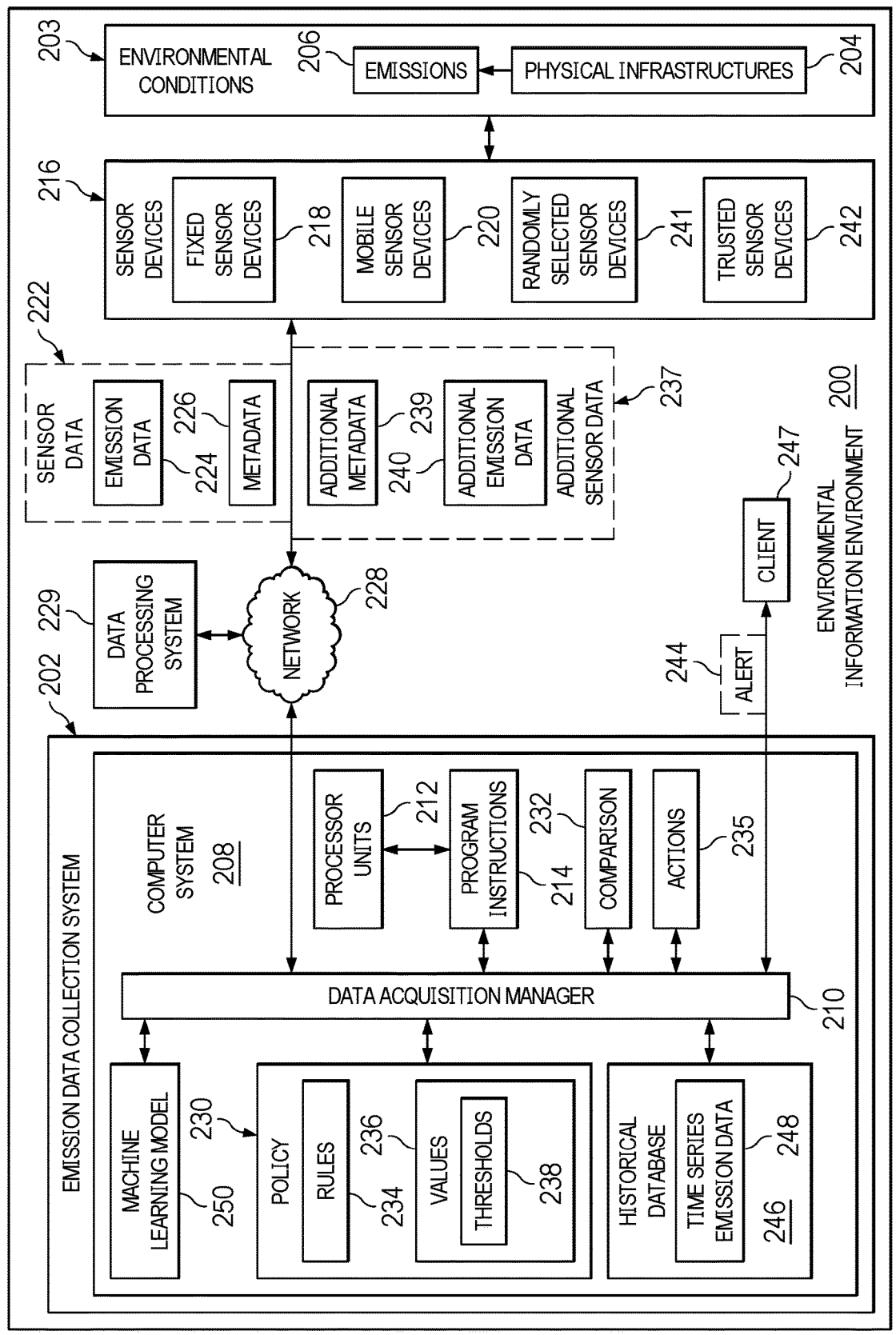
FIG. 2 is a block diagram of an emission data environment in accordance with an illustrative embodiment.

In this illustrative example, the illustration of sensor 134, environmental sensor unit 116, mobile phone 118 are only examples of some types of devices that can generate and send emission data to data acquisition manager 140. Additional sensor devices that are not depicted in this example can be present in client devices 110 that send emission data to data acquisition manager 140. With reference now to FIG. 2, a block diagram of an emission data environment is depicted in accordance with an illustrative embodiment. In this illustrative example, environmental information environment 200 includes components that can be implemented in hardware such as the hardware shown in network data processing system 100 in FIG. 1.

In this illustrative example, emission data collection system 202 monitors environmental conditions 203 around physical infrastructures 204. Environmental conditions can be, for example, temperature, pressure, ambient light, or other measurable quantities in the environment. Environmental conditions 203 can include emissions 205 emitted from physical infrastructures 204.

Physical infrastructures 204 are objects of interest with respect to emissions 206 that are emitted from physical infrastructures 204. Physical infrastructures 204 can be selected from at least one of a manufacturing facility, a chip plant, a power plant, a building, a city block, a section of road, a field, a section of a river, a pond, or some other object for which emissions 206 are of interest.

In this illustrative example, emission data collection system 202 comprises computer system 208 and data acquisition manager 210. Data acquisition manager 210 is located in computer system 208.

Data acquisition manager 210 can be implemented in software, hardware, firmware, or a combination thereof. When software is used, the operations performed by data acquisition manager 210 can be implemented in program instructions configured to run on hardware, such as a processor unit. When firmware is used, the operations performed by data acquisition manager 210 can be implemented in program instructions and data and stored in persistent memory to run on a processor unit. When hardware is employed, the hardware may include circuits that operate to perform the operations in data acquisition manager 210.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 208 is a physical hardware system and includes one or more data processing systems. When more than one data processing system is present in computer system 208, those data processing systems are in communication with each other using a communications medium. The communications medium may be a network. The data processing systems may be selected from at least one of a computer, a server computer, a tablet, or some other suitable data processing system.

As depicted, computer system 208 includes a number of processor units 212 that are capable of executing program instructions 214 implementing processes in the illustrative examples such as those for data acquisition manager 210. As used herein a processor unit in the number of processor units 212 is a hardware device and is comprised of hardware circuits such as those on an integrated circuit that respond and process instructions and program code that operate a computer. When a number of processor units 212 execute program instructions 214 for a process, the number of processor units 212 is one or more processor units that can be on the same computer or on different computers. In other words, the process can be distributed between processor units on the same or different computers in a computer system. Further, the number of processor units 212 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Data acquisition manager 210 can monitor emissions 206 for physical infrastructures 204 using sensor devices 216. Sensor devices 216 are hardware and can also include software. In this illustrative example, sensor devices 216 can comprise at least one of fixed sensor devices 218 or mobile sensor devices 220.

Fixed sensor devices 218 are sensor devices designed to be placed in a fixed location to measure environmental conditions 203. In these examples, fixed sensor devices 218 are not designed to be mobile or moved frequently.

Mobile sensor devices 220 can be moved to different locations to measure environmental conditions 203. For example, mobile sensor devices 220 can be at least one of a mobile phone, a laptop computer, a tablet computer, a mobile sensor unit, or some other sensor that can be moved. Mobile sensor devices 220 can be, for example, handheld devices can be carried by a person or attached a vehicle.

In this illustrative example, sensor devices 216 can measure environmental conditions 203 to generate sensor data 222. In measuring environmental conditions 203, sensor devices 216 can measure emissions 206 as well as other environmental conditions in environmental conditions 203 around physical infrastructures 204.

As depicted, sensor devices 216 generate sensor data 222. As depicted sensor data 222 comprises emission data 224 from sensor devices 216 measuring environmental conditions 203. Emission data 224 can be generated from at least one of direct measurements of emissions 206 or measurements of environmental conditions 203 that can be affected by emissions 206. Emission data 224 can also include measurements of other environmental conditions in environmental conditions 203 made in locations around physical infrastructures 204.

Sensor data 222 can also include metadata 226. In these illustrative examples, metadata 226 describes or gives context to emission data 224.

As depicted, sensor devices 216 transmit sensor data 222 over network 228 to data acquisition manager 210 in computer system 208. In this illustrative example, sensor data 222 is sent in real time. In other words, sensor data 222 is sent as quickly as possible without intentional delay over network 228 to data acquisition manager 210. In other examples, sensor data 222 can be sent periodically.

During operation of data acquisition manager 210, data acquisition manager 210 can collect emission data 224 in sensor data 222 received from sensor devices 216 over network 228. In some illustrative examples, data acquisition manager 210 can use all of sensor devices 216 to collect sensor data 222.

In another illustrative example, data acquisition manager 210 can select different ones of sensor devices 216 that are used to collect sensor data 222. For example, sensor devices 216 selected for use in collecting sensor data 222 can actively monitor environmental conditions 203. Other sensor devices in sensor device 216 not selected can be idle reducing at least one of power usage or network usage. As result, sensor devices 216 sending emission data 224 can be a subset of all of sensor devices 216. In this example, data acquisition manager 210 can collect all of sensor data 222 received from sensor devices 216 selected for use in collecting sensor data 222.

In collecting sensor data 222 from sensor devices 216, sensor data 222 can be submitted by all of sensor devices 216 and data acquisition manager 210 can select sensor data 222 received from some of sensor devices 216 for collection. In other words, data acquisition manager 210 can collect a portion of sensor data 222 sent from sensor devices 216.

In another example, in collecting sensor data 222 from sensor devices 216, sensor data 222 is submitted only by sensor devices 216 selected by data acquisition manager 210. In this example, data acquisition manager 210 actively collects sensor data 222 from selected ones of sensor devices 216 by sending requests for sensor data 222 to the selected ones of sensor devices 216.

Further, in collecting sensor data 222, data acquisition manager 210 may not receive sensor data 222 directly from sensor devices 216. In one illustrative example, data acquisition manager 210 can collect sensor data 222 submitted by sensor devices 216 indirectly. For example, data processing system 229 can receive sensor data 222 from sensor device 216. Data processing system 229 can be, for example, such as a computer, a computer system, a computer cluster, or other type of data processing system.

Data processing system 229 can then send sensor data 222 to data acquisition manager 210 for collection and processing. As result, sensor data 222 collected by data acquisition manager 210 occurs indirectly through receiving sensor data 222 from data processing system 229 rather than directly from sensor devices 216. In this illustrative example, data processing system 229 can be managed or owned by a different entity or organization from data acquisition manager 210.

In the illustrative example, this type of data collection and transmission from data processing system 229 to data acquisition manager 210 can be in real time in which sensor data 222 is received and transmitted as quickly as possible without any intentional delay.

The selection of sensor devices 216 from which sensor data 222 is collected by data acquisition manager 210 can be performed in a number of different ways in addition to selecting sensor devices 216 such that different groups of sensor devices 216 are used. For example, sensor devices 216 can be selected such that emission data 224 is collected from randomly selected sensor devices 241 in sensor devices 216.

As another example, sensor devices 216 can be selected such that emission data 224 is collected from trusted sensor devices 242 in sensor devices 216. A trusted sensor device is a sensor device in sensor devices 216 that has a desired level of trust for sending emission data 224. For example, the trusted sensor device can have a level of accuracy that has been verified by comparing emission data 224 with emission data 224 from other sensor devices. In another example, a trusted sensor device can be one that has been certified or verified as being used by a trusted user. This trusted user can be a person, a corporation, an organization, or other entity.

Data acquisition manager 210 compares emission data 224 to policy 230 for collecting emission data 224 to form comparison 232 between the emission data and the policy 230. As depicted, policy 230 comprises rules 234 and values 236 that can be used to apply rules 234. In this example, one or more of rules 234 are used determine a set of actions 235 that can be performed based on comparison 232.

For example, values 236 can take the form of a set of thresholds 238. With this example, data acquisition manager 210 can compare emission data 224 to a set of thresholds 238 for emission data 224 to form comparison 232 between emission data 224 and the set of thresholds 238.

Comparison 232 can be made in a number of different ways. For example, comparison 232 can indicate whether emission data 224 has crossed the set of thresholds 238. This crossing of the set of thresholds 238 can be whether emission data 224 is greater than the set of thresholds, less than the set of thresholds, or equal to the set of thresholds. The type crossing is specified by rules 234 in policy 230.

With the results of comparison 232, policy 230 can be used by data acquisition manager 210 to perform a set of actions 235. In one illustrative example, set of actions can be changing a collection of additional sensor data 237 that comprises additional emission data 240 and additional metadata 239 from sensor devices 216 over the network 228 based on comparison 232 between emission data 224 and the set of thresholds 238. In another example, the set of actions 235 can also include at least one of controlling operation of physical infrastructures 204, controlling devices in communication with network 228, or other suitable actions. In controlling the operation of a physical infrastructure in physical infrastructures 204, the operation of the physical infrastructure can be controlled to reduce emissions 206 to a desired level.

This change in the collection of additional emission data 240 can take a number of different forms. For example, the collection of additional emission data 240 can be performed at a higher frequency as compared to the frequency used for collecting emission data 224. In another example, the collection of additional emission data 240 can be collecting a larger amount of emission data of sensor data 222 in a sampling of emission data 224.

In yet another illustrative example, emission data 224 can be collected by first set of sensor devices 216. The collection of additional emission data 240 can be performed by collecting additional emission data 240 from a second set of sensor devices 216 that is different from the first set of sensor devices 216 that collected emission data 224. For example, the second set of sensor devices 216 can be entirely new sensor devices in sensor devices 216. In other illustrative examples, the second set of sensor devices can include some of the sensor devices in the first number of sensor devices 216. Additionally, the second set of sensor devices 216 can include more sensor devices or less sensor devices than the first set of sensor devices 216. The second set of sensor devices 216 can have the same number of sensor devices as the first set of sensor device 216 if the makeup of the first set of sensor devices 216 is different from the makeup of the second set of sensor devices 216.

Further, actions 235 can include other actions in addition to changing the manner in which emission data 224 is collected by sensor devices 216. For example, when emission data 224 for a parameter is compared to an alert threshold in thresholds 238 data acquisition manager 210 can send alert 244 to client 247 in response to emission data 224 crossing alert threshold in thresholds 238. Alert 244 can be sent in different form such as an email message, a text message, or in some other suitable manner.

Client 247 can be any entity, device, computer, structure, or other object that subscribes to receive alerts. For example, client 247 can be a manufacturing plant in physical infrastructures 204 that generated emissions 206 that resulted in emission data 224 that resulted in alert 244. Alert 244 include information such as a parameter for which the alert threshold was crossed, a location of the sensor device, a physical infrastructure for which emissions 206 were detected, the timestamp of the emission data, or other suitable information.

The illustrative example, data acquisition manager 210 can analyze and store emission data 224 and additional emission data 240 in historical database 246. Emission data 224 and additional emission data 240 can be processed by data acquisition manager 210 to form time series emission data 248 that is stored in historical database 246.

Time series emission data 248 is a collection of measurements or observations of environmental conditions 203 at different time intervals. The measurements or environmental conditions 203 at different time intervals can be for emissions 206 or other parameters can be affected by emissions 206. Time series emission data 248 can be generated for each physical infrastructure in physical infrastructures 204.

In this illustrative example, the processing of emission data 224 and additional emission data 240 can be performed by data acquisition manager 210 using machine learning model 250. A machine learning model is a type of artificial intelligence model that can learn without being explicitly programmed. A machine learning model can learn based training data input into the machine learning model.

The machine learning model can learn using various types of machine learning algorithms. The machine learning algorithms include at least one of a supervised learning, and unsupervised learning, a feature learning, a sparse dictionary learning, an anomaly detection, a reinforcement learning, a recommendation learning, or other types of learning algorithms. Examples of machine learning models include an artificial neural network, a decision tree, a support vector machine, a regression machine learning model, a classification machine learning model, a random forest learning model, a Bayesian network, a genetic algorithm, and other types of models. These machine learning models can be trained using data and process additional data to provide a desired output.

In one illustrative example, one or more technical solutions are present that overcome a technical problem with monitoring emissions in in a timely manner that makes the data useful. Further, one or more technical solutions are present that overcome a technical problem with the use of network and sensor device resources.

As a result, one or more technical solutions may provide a technical effect providing real time or near real time monitoring of emissions that makes emission data available sooner than emission data that is collected and processed by human operators to create reports published by entities such as nation government agencies, state regulatory agencies, and other sources.

Additionally, one or more technical solutions may provide an ability to collect emission data that can be in a dynamic and adaptive manner based on an analysis of the emission data that is collected. One or more technical solutions can change the manner in which emission data is collected such that not all sensor devices need to collect and transmit emission data.

In this manner, the use of network resources can be reduced by collecting less emission data when less emission data is needed for a particular environmental condition. By collecting less emission data, some sensor devices can conserve battery power or be available to perform other functions or actions. Further, at least one of a reduction in the use of in network resources or a reduction the use of sensor device resources can occur.

Additionally, when sensor data is received from all of the sensor devices, only some of the emission data received may need to be processed. In this example, only some of the sensor data received is "collected" for processing. Thresholds can be used to determine when additional sensor data should be processed. As result, the amount of emission data processed can be reduced. This type of emission data collection can reduce the use of processing resources in a computer system that collects and processes emission data.

Computer system 208 can be configured to perform at least one of the steps, operations, or actions described in the different illustrative examples using software, hardware, firmware, or a combination thereof. As a result, computer system 208 operates as a special purpose computer system in which data acquisition manager 210 in computer system 208 enables collecting sensor data 222 in a dynamic manner that increases the efficiency in which resources are used. These efficiencies can be increased in data processing components selected from at least one of computer system 208, network 228, data processing system 229, or sensor devices 216. In particular, data acquisition manager 210 transforms computer system 208 into a special purpose computer system as compared to currently available general computer systems that do not have data acquisition manager 210.

In the illustrative example, the use of data acquisition manager 210 in computer system 208 integrates processes into a practical application for method monitoring emission data that increases the performance of at least one of computer system 208 computer system 208, network 228, data processing system 229, or sensor devices 216. This increase in performance can occur through reducing processing resources in one or more of these components by dynamically changing the amount of sensor data 222 collected by data acquisition manager 210. In other words, data acquisition manager 210 in computer system 208 is directed to a practical application of processes integrated into data acquisition manager 210 in computer system 208 that can dynamically collect sensor data for measuring environmental conditions 203. In this manner, data acquisition manager 210 in computer system 208 provides a practical application of controlling the manner in which sensor data 222 is collected to reduce the use of resources in components such as at least one of computer system 208, network 228, data processing system 229, or sensor devices 216 based on analyzing sensor data 222 received from sensor device 216.

Figure 3:
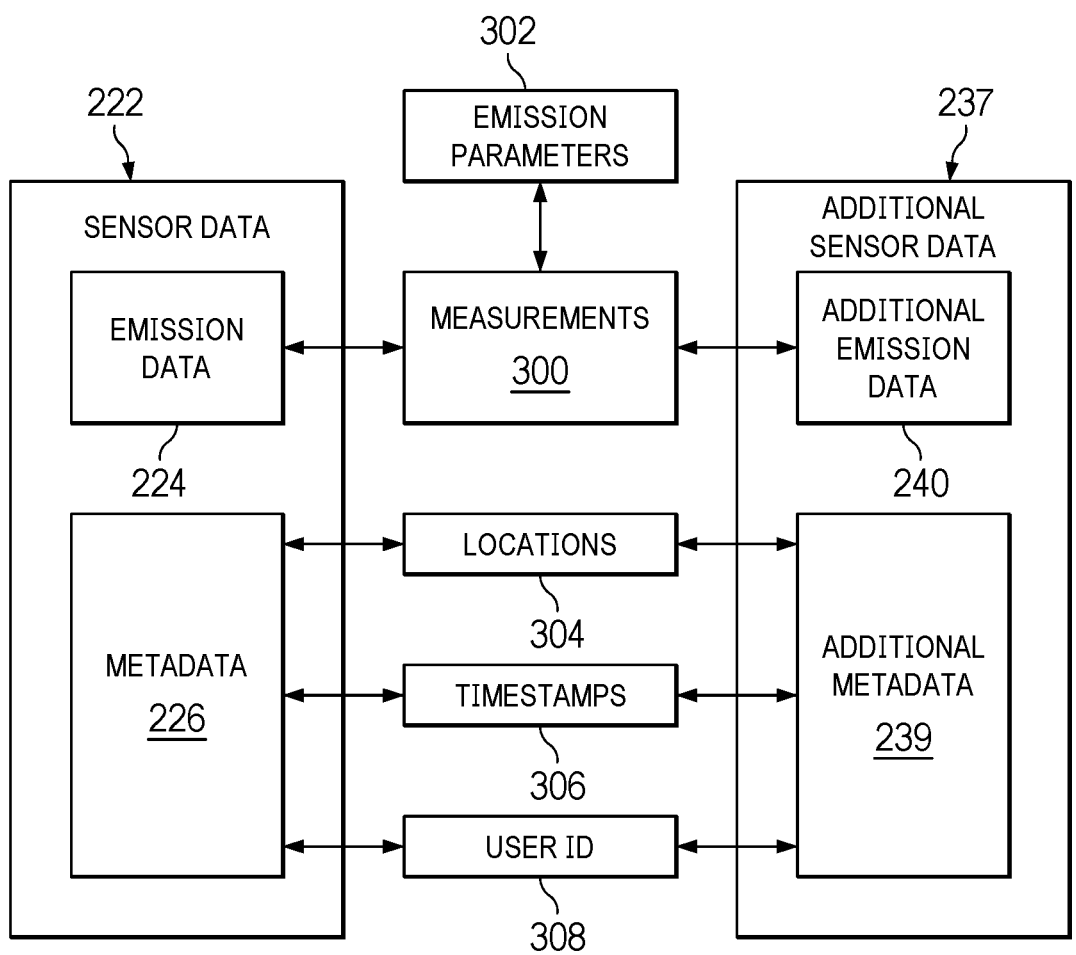
FIG. 3 is a block diagram of sensor data in accordance with an illustrative embodiment.

With reference next to FIG. 3, a block diagram of sensor data is depicted in accordance with an illustrative embodiment. In this illustrative example, sensor data 222 comprises of emission data 224 and metadata 226, and additional sensor data 237 comprises the additional emission data 240 and additional metadata 239.

As depicted, emission data 224 and additional emission data 240 can be sensor data that is generated from measurements 300 for a set of emission parameters 302 for environmental conditions 203. Emission parameters 302 can take a number of different forms. For example, the set of emission parameters 302 can be selected from at least one of a volatile organic compound, carbon monoxide, carbon dioxide, methane, a particulate, a temperature, a pressure, or ambient light, or other suitable parameters.

In this illustrative example, volatile organic compounds, carbon monoxide, carbon dioxide, methane, particulates can be measured in emissions 206 in environmental conditions 203. As another example, the temperature of the air or water can be measured as an effect of heat emitted from a physical infrastructure. Ambient light can also be measured in environmental conditions 203 as an emission parameter that can be used in the analysis of emissions 206.

As depicted, metadata 226 and additional metadata 239 comprises locations 304 and timestamps 306. Locations 304 are locations of sensor devices 216 when measurements 300 are made. In this illustrative example, locations 304 can include a longitude and latitude. Further, locations 304 can also include an altitude. Timestamps 306 are the times at which measurements 300 are made. Timestamps 306 can be associated measurements 300 in emission data 224.

In this example, metadata 226 and additional metadata 239 also includes user IDs 308. In this example, user IDs 308 identifies the users of a sensor device. The user can be a person, a business, or some other entity.

Metadata 226 and additional metadata 239 can include other types of data in addition to locations 304, timestamps 306, and user IDs 308. For example, metadata 226 can include at least one of software version, a hardware version, a device identifier, or other suitable information in addition to locations 304 and timestamps 306.

Figure 4:
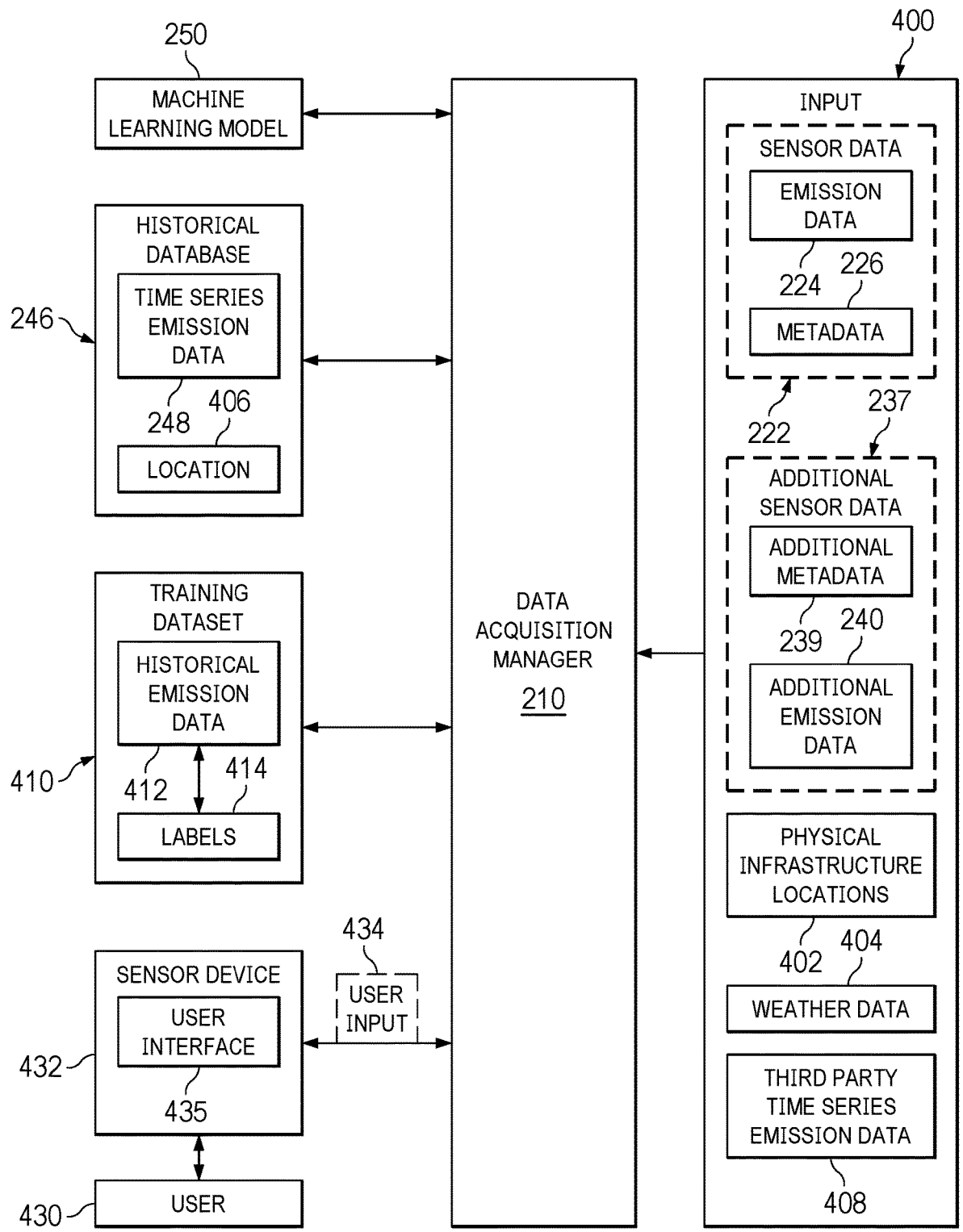
FIG. 4 is an illustration of dataflow for processing emission data using a machine learning model in accordance with an illustrative embodiment.

With reference next to FIG. 4, an illustration of dataflow for processing emission data using a machine learning model is depicted in accordance with an illustrative embodiment. In this illustrative example, machine learning model 250 can be used by data acquisition manager 210 to process input 400 in the form of sensor data 222 and additional sensor data 237.

For example, machine learning model 250 can correlate measurements 300 for emission parameters 302 in the emission data 224 with locations 304 and timestamps 306 in metadata 226. Machine learning model 250 can also correlate measurements 300 for emission parameters 302 in additional emission data 240 with locations 304 and timestamps 306 in additional metadata 239. The correlations performed for emission data 224 and additional emission data 240 form time series emission data 248.

Data acquisition manager 210 can save time series emission data 248 generated from the correlations performed by machine learning model 250 in historical database 246.

Additional processing can be performed by machine learning model 250 in addition to correlating measurements 300 with locations 304 and timestamps 306. For example, machine learning model 250 can also correlate time series emission data 248 with physical infrastructures 204. Locations 304 in time series emission data 248 can be correlated to physical infrastructure locations 402 in input 400. Physical infrastructure locations 402 are locations for physical infrastructures 204.

In other words, machine learning model 250 can determine which time series data in time series emission data 248 is for a particular physical infrastructure using locations 304 in time series emission data 248 and physical infrastructure locations 402 for physical infrastructures 204.

As another example, machine learning model 250 can correlate time series emission data 248 with weather data 404 in input 400. In yet another illustrative example, machine learning model 250 can be used to supplement time series emission data 248 for location 406 in historical database 246 with third party time series emission data 408 in input 400 in response to insufficient time series emission data being present for the location 406. Third party time series emission data 408 can be obtained from a number of different sources. For example, third party time series emission data 408 least one of satellite images, emission data from third party sensor devices, or from other sources.

Additionally, data acquisition manager 210 can perform filtering of emission data 224 and additional emission data 240 to remove emission data 224 and additional emission data 240 generated in an artificial environment. An artificial environment can be an environment in which emissions 206 are not normally introduced. For example, artificial environment can be a coat pocket, inside a purse, in a briefcase, or some other object in which emissions 206 are not expected to normally be present for monitoring. In some cases, the interior of the building is artificial environment and in other cases, the interior of the building is a natural environment and is a location in which emissions 206 are present and should be monitored.

In this illustrative example, machine learning model 250 can be trained to perform at least one of correlations or filtering using input 400. As depicted, data acquisition manager 210 can create training dataset 410 for use in training machine learning model 250.

Training dataset 410 can comprise historical emission data 412 collected from different locations such as from locations of interest such as those around physical infrastructures 204. Labels 414 are applied to historical emission data 412. Labels can include timestamps and locations for historical emission data 412.

Further time series emission data 248 can be used to provide further training of machine learning model 250. For example, user 430 of sensor device 432 can interact with user interface 435 in sensor device 432 to send user input 434 to data acquisition manager 210 to verify accuracy of sensor data 222 generated by sensor device 432. That verification in user input 434 can be used to select sensor data 222 that will be used to generate time series emission data 248. In other words, this sensor data is collected by data acquisition manager 210.

User 430 can also be provided access to time series emission data 248 for submitting sensor data 222. For example, data acquisition manager 210 can enable user 430 of sensor device 432 access to time series emission data 248 in response to user 430 enrolling sensor device 432 to participate in collecting emission data 224.

The illustration of environmental information environment 200 in the different components in in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the collection of data by data acquisition manager 210 can be performed dynamically in such that subsequent data collections subsequent to the collection of sensor data 222 in additional sensor data 237 can occur in which the collection of subsequent sensor data changes. This change in the collection of subsequent sensor data can occur continuously as data acquisition manager 210 receives the subsequent sensor data from sensor devices 216 and processes that subsequent sensor data using policy 230. In this manner, data acquisition manager 210 can change the collection of subsequent sensor data based on the measurement of emissions 206 detected from physical infrastructures 204 over time and other parameters in the environmental conditions 203 over time. As result, the collection of sensor data generated from measurements of environmental conditions 203 can be controlled dynamically over time based on the measurements made. As result, the use of processing resources can change based on the sensor data needed to monitor environmental conditions 203 such as emissions 206 for physical infrastructures 204.

Figure 5:
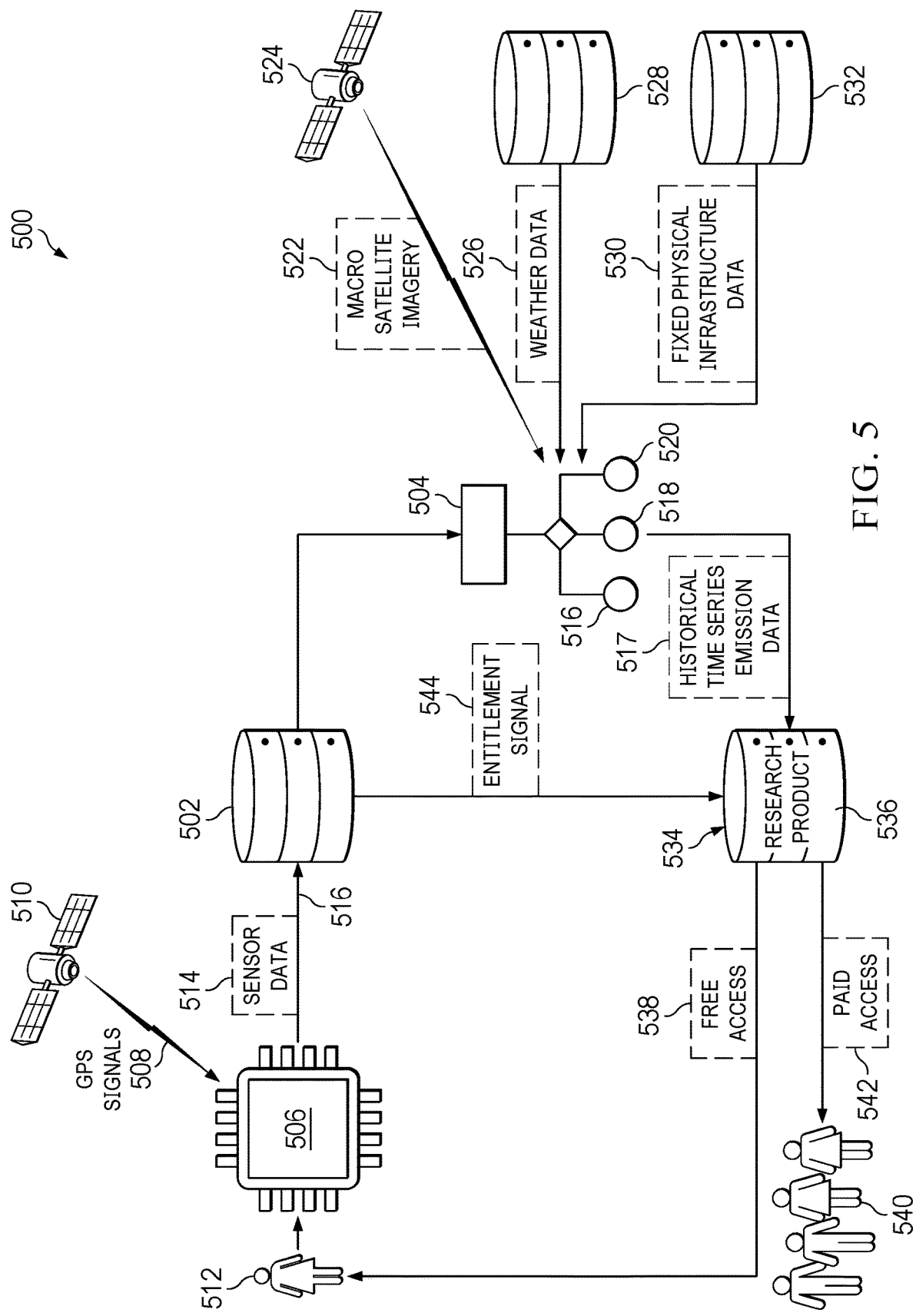
FIG. 5 is an illustration of a data flow diagram for collecting and processing emission data in accordance with an illustrative embodiment.

Turning now to FIG. 5, an illustration of a data flow diagram for collecting and processing emission data is depicted in accordance with an illustrative embodiment. Data flow diagram 500 illustrates data flow used to collect and process emission data. In this illustrative example, data acquisition manager 502 in data flow diagram 500 is an example of data acquisition manager 210 form in FIG. 2.

Machine learning model 504 in data flow diagram 500 is an example of machine learning model 250 shown in FIG. 2 and FIG. 4.

As depicted, sensor device 506 operates as an environmental data capture device to collect information about the environment. For example, the data captured can be emission data. In this example, sensor device 506 can be based on Raspberry PI or similar hardware, running environment sensor to capture emission data. In another example, sensor device 506 can be packaged as a mobile phone connected to a sensor with the mobile phone providing power, Internet access, global positioning system (GPS) information. In other examples, the sensor can be integrated in the mobile phone.

Sensor data 514 generated by sensor device 506 can be, for example, carbon dioxide ($CO_2$), total volatile organic compounds (TVOC), humidity, temperature, pressure, or other suitable data. Emission data can include at least one of measurements of emissions for other parameters relevant for analyzing or processing measurements of emissions.

In this illustrative example, sensor device 506 can receive GPS signals 508 from satellite 510 to determine the location of sensor device 506 when generating sensor data 514. This location information can be used to associate sensor data 514 with particular location of sensor device 506 when measurements were made to generate sensor data 514.

Contributing user 512 registers or enrolls sensor device 506 to make measurements about the environment for particular parameters. Contributing user 512 can provide sensor device 506, place sensor device 506 in an outdoor location, provides power, and Internet connectivity. In other examples, contributing user 512 can carry sensor device 506 as contributing user 512 moves during daily activities.

In this example, sensor data 514 is sent by sensor device 506 over wireless connection 516 to data acquisition manager 502. In this illustrative example, sensor data 514 comprises emission data and metadata. Emission data comprises measurements made of environmental conditions, such as emissions, temperature, pressure, humidity, and other environmental conditions. The metadata includes, for example, locations, timestamps, contributor ID, and other suitable information.

Data acquisition manager 502 processes sensor data 514. This processing can be performed in real time or near real time. The processing of sensor data 514 can include, for example, validating sensor data 514 in real time, analyzing sensor data 514, and saving sensor data 514. This processing can also include cleaning sensor data 514 to remove erroneous or unreliable sensor data. Further, data acquisition manager 502 can generate alerts to registered clients in real time in response to receiving and processing sensor data 514 in in real time.

As depicted, machine learning model 504 can be used by data acquisition manager 502 to process sensor data 514. For example, machine learning model 504 can be used to correlate ground truth from sensors with other data to build historical time series emission data 517. This other data can include, for example, macro satellite imagery 522 received from satellite 524, weather data 526 from weather source 528, fixed physical infrastructure data 530 from physical infrastructure database 532.

Weather source 528 can be, for example, National Centers for Environmental Information (NCEI), Meteorological Simulation Data Ingest System (MADIS), or other suitable services. Physical infrastructure database 532 can be a database of physical infrastructures and information about the physical infrastructures. For example, physical infrastructure database 532 can include information about manufacturing facilities, plants, mines, or other physical infrastructures that can generate emissions.

This information can also include an identification of parameters for environmental conditions that can be monitored for the different physical infrastructures. For example, information about physical infrastructures can include an identification of what emissions are of interest to monitor for the different physical infrastructures in physical infrastructure database 532.

Further, machine learning model 504 can generate localized emission data 518. Localized emission data 518 is emission data that is correlated to physical infrastructures such as known plants, refineries, or other facets of interest such as weather. This correlation can be performed by identifying localized emission data 518 being generated by locations within some distance of the physical infrastructure. The distance can also depend on weather conditions such as wind, temperature, humidity, and other types of conditions.

Additionally, machine learning model 504 can generate interpolated emission data 520. In this example, interpolated emission data 520 is emission data that is generated to fill in gaps in the emission data generated by sensors. Interpolated emission data 520 can be generated using satellite imagery for areas not covered by sensor devices. This sensor data can be obtained from various sources such as macro satellite imagery of methane, carbon dioxide ($CO_2$), other emissions or pollutants.

In this illustrative example, machine learning model 504 can use weather data 526 to correlate readings from sensor devices the locations corresponding to weather data 526. For example, at least one of temperature, pressure, or humidity data in weather data 526 can be compared to measurements of these parameters made by sensor devices in corresponding locations. These comparisons can be made to determine accuracy of sensor devices and to determine whether the sensor devices are in the natural environment or in an artificial environment.

In this example, fixed physical infrastructure data 530 can be used to correlate the emission data to particular physical infrastructures. The location information for the emission data can be used to associate that emission data with particular physical infrastructures based on the locations of those physical infrastructures in fixed physical infrastructure data 530.

In this example, this information can be stored in research product repository 534 to form research product 536, giving near real time alerting of conditions for selected locations as well as historical timeseries of conditions.

Access to research product 536 can be provided in any number of different ways. For example, free access 538 is provided to contributing user 512. This type of access can provide an incentive for contributing user 512 to provide sensor device 506. Customers 540 have paid access 542 to research product 536. Customers 540 can pay for subscriptions to access research product 536. This type of access can include obtaining information for use in generating benchmarks, comparisons, and reports to regulations.

In this illustrative example, entitlement signal 544 is sent to research product repository 534 by data acquisition manager 502 in response to receiving sensor data 514 from contributing user 512. The signal causes research product repository 534 to set an access control list to enable free access 538 to contributing user 512. This signal can be sent periodically to continue enabling free access 538 to contributing user 512. In other examples, free access 538 can be provided until the access is revoked.

The illustration of data flow diagram 500 is an example of one implementation for dataflow using an emission data collection system. This illustration is not meant to limit the manner in which other data flows can be performed. For example, the dataflow only shows a single sensor device. Other illustrative examples can employ hundreds, thousands, or hundreds of thousands of sensor devices. Further, in another illustrative example one or more machine learning models can be present in addition to machine learning model 504. Data acquisition manager 502 can use these additional machine learning models to perform different types of analysis or correlations.

For example, a machine learning model can be used to predict future emissions from a particular physical infrastructure. This prediction can be used predict when emissions may exceed a threshold for emissions at a future point in time. In response to this prediction, an alert to an infrastructure manager that manages the operation of the physical infrastructure. This alert can be used by the infrastructure manager to perform actions that can reduce emissions in a manner that avoid emissions from crossing the physical infrastructure. Continued monitoring of the physical infrastructure by data acquisition manager 502 can determine whether these actions were successful.

Figure 6:
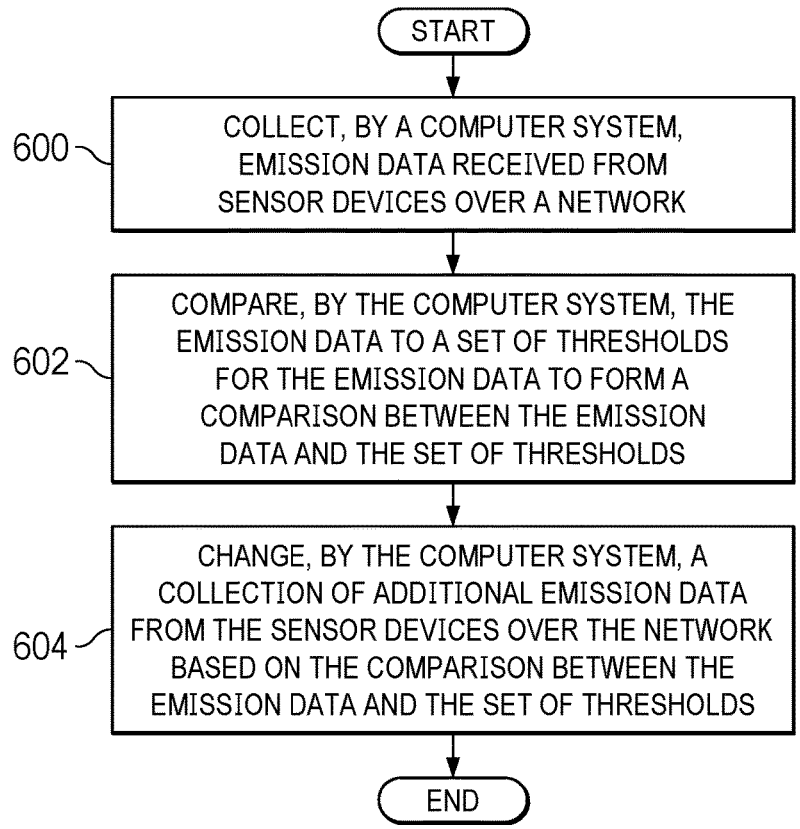
FIG. 6 is an illustration of a flowchart of a process for monitoring emission data transmitted over a network in accordance with an illustrative embodiment.

With reference to FIG. 6, an illustration of a flowchart of a process for monitoring emission data transmitted over a network is depicted in accordance with an illustrative embodiment. The process illustrated in FIG. 6 can be implemented using data acquisition manager 140 in server computer 104 in FIG. 1 or data acquisition manager 210 in computer system 208 in FIG. 2.

As depicted, the process begins by collecting, by a computer system, emission data received from sensor devices over a network (step 600). The process compares, by the computer system, the emission data to a set of thresholds for the emission data to form a comparison between the emission data and the set of thresholds (step 602). The process changes, by the computer system, a collection of additional emission data from the sensor devices over the network based on the comparison between the emission data and the set of thresholds (step 604). The process terminates thereafter.

Figure 7:
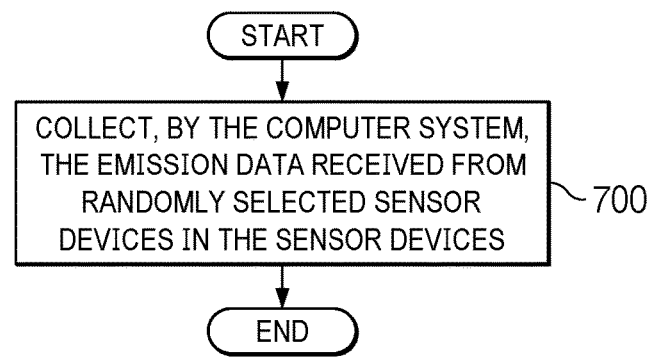
FIG. 7 is an illustration of a flowchart of a process for collecting emission data received from randomly selected sensor devices in accordance with an illustrative embodiment.

With reference to FIG. 7, an illustration of a flowchart of a process for collecting emission data received from randomly selected sensor devices is depicted in accordance with an illustrative embodiment. The process illustrated in FIG. 7 is an example of one implementation for step 600 in FIG. 6. The process collects, by the computer system, the emission data received from randomly selected sensor devices in the sensor devices (step 700). The process terminates thereafter.

Figure 8:
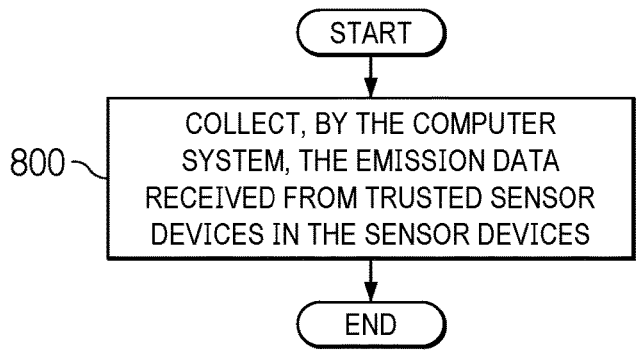
FIG. 8 is an illustration of a flowchart of a process for collecting emission data from trusted sensor devices in accordance with an illustrative embodiment.

With reference to FIG. 8, an illustration of a flowchart of a process for collecting emission data from trusted sensor devices is depicted in accordance with an illustrative embodiment. The process illustrated in FIG. 8 is an example of one implementation for step 600 in FIG. 6. The process collects, by the computer system, the emission data received from trusted sensor devices in the sensor devices (step 800). The process terminates thereafter.

Figure 9:
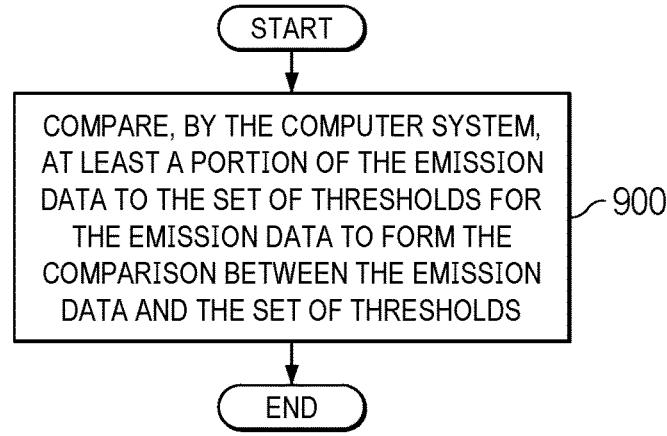
FIG. 9 is an illustration of a flowchart of a process for comparing emission data to a set of thresholds to form a comparison in accordance with an illustrative embodiment.

Turning next to FIG. 9, an illustration of a flowchart of a process for comparing emission data to a set of thresholds to form a comparison is depicted in accordance with an illustrative embodiment. The process illustrated in FIG. 9 is an example of one implementation for step 602 in FIG. 6. The process compares, by the computer system, at least a portion of the emission data to the set of thresholds for the emission data to form the comparison between the emission data and the set of thresholds (step 900). The process terminates thereafter.

Figure 10:
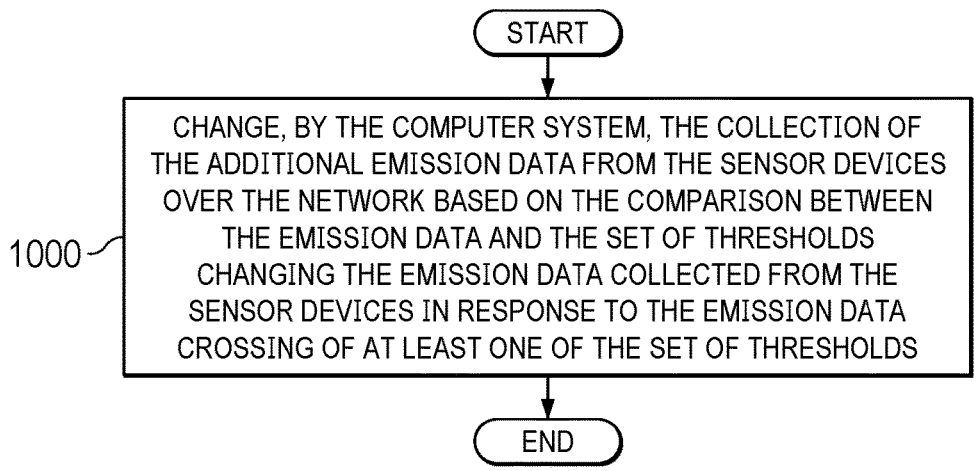
FIG. 10 is an illustration of a flowchart of a process for changing collection of additional emission data in accordance with an illustrative embodiment.

Turning to FIG. 10, an illustration of a flowchart of a process for changing collection of additional emission data is depicted in accordance with an illustrative embodiment. The process illustrated in FIG. 10 is an example of one implementation for step 604 in FIG. 6. The process changes, by the computer system, the collection of the additional emission data from the sensor devices over the network based on the comparison between the emission data and the set of thresholds changing the emission data collected from the sensor devices in response to the emission data crossing of at least one of the set of thresholds (step 1000). The process terminates thereafter.

Figure 11:
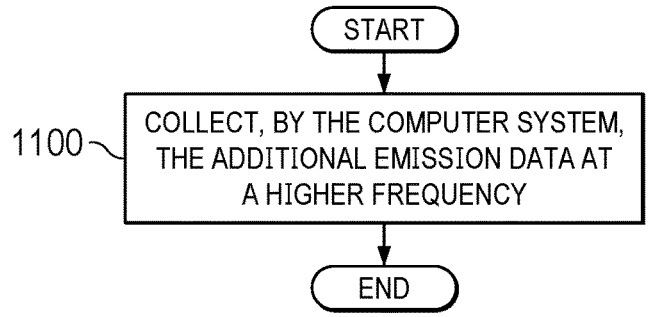
FIG. 11 is an illustration of a flowchart of a process for collecting additional emission data at a higher frequency in accordance with an illustrative embodiment.

With reference to FIG. 11, an illustration of a flowchart of a process for collecting additional emission data at a higher frequency is depicted in accordance with an illustrative embodiment. The process illustrated in FIG. 11 is an example of one implementation for step 604 in FIG. 6. The process collects, by the computer system, the additional emission data at a higher frequency (step 1100). The process terminates thereafter.

Figure 12:
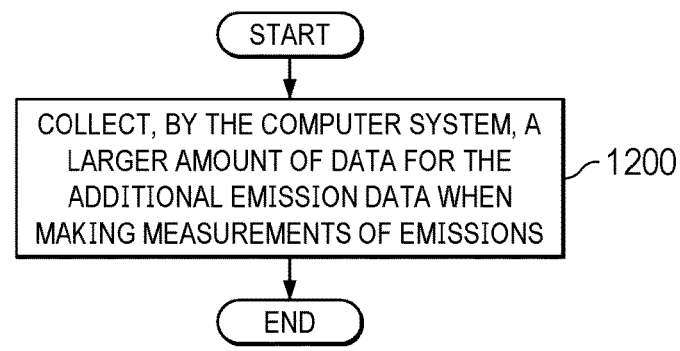
FIG. 12 is an illustration of a flowchart of a process for collecting a larger amount of emission data in accordance with an illustrative embodiment.

Turning next to FIG. 12, an illustration of a flowchart of a process for collecting a larger amount of additional emission data is depicted in accordance with an illustrative embodiment. The process illustrated in FIG. 12 is an example of one implementation for step 604 in FIG. 6. The process collects, by the computer system, a larger amount of data for the additional emission data when making measurements of emissions (step 1200). The process terminates thereafter.

Figure 13:
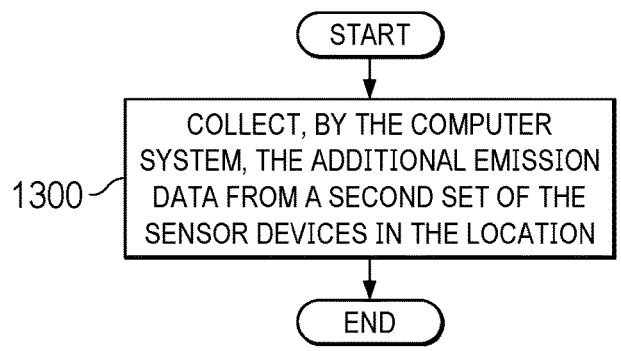
FIG. 13 is an illustration of a flowchart of a process for collecting emission data from a second set of sensor devices in accordance with an illustrative embodiment.

Turning to FIG. 13, an illustration of a flowchart of a process for collecting additional emission data from a second number of sensor devices is depicted in accordance with an illustrative embodiment. The process illustrated in FIG. 13 is an example of one implementation for step 604 in FIG. 6. In this example, the emission data collected by the data acquisition manager is generated by first set of sensor devices.

The process collects, by the computer system, the additional emission data from a second set of the sensor devices in the location (step 1300). The process terminates thereafter.

In step 1300, The second set of sensor devices can be entirely new sensor devices. In other illustrative examples, the second set sensor devices can include some of the sensor devices in the first set sensor devices. Additionally, the second set of sensor devices can include more sensor devices or less sensor devices than the first set sensor devices. In another example, the second set of sensor devices can have the same number of sensor devices as the first set sensor devices when the makeup of the second set of sensor devices is different from the makeup of the first set of sensor devices.

Figure 14:
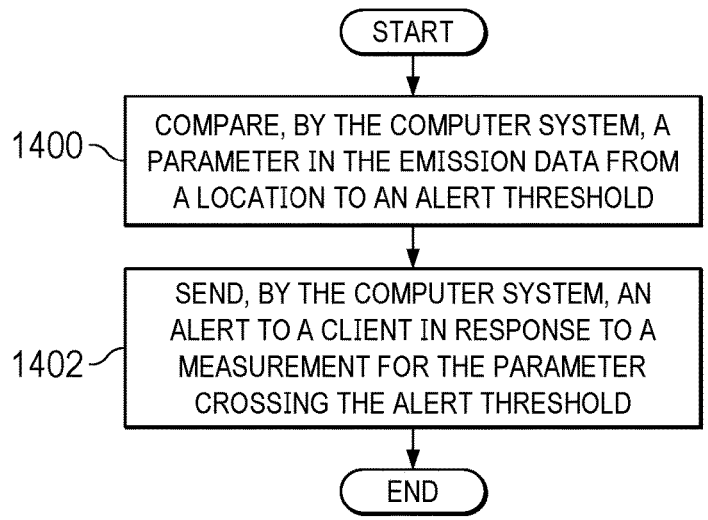
FIG. 14 is an illustration of a flowchart of a process for sending an alert in accordance with an illustrative embodiment.

With reference to FIG. 14, an illustration of a flowchart of a process for sending an alert is depicted in accordance with an illustrative embodiment. The steps in this figure are examples of additional steps that can be used within the steps in the process in FIG. 6.

The process begins by comparing, by the computer system, a parameter in the emission data from a location to an alert threshold (step 1400). The process sends, by the computer system, an alert to a client in response to a measurement for the parameter crossing the alert threshold (step 1402). The process terminates thereafter.

Figure 15:
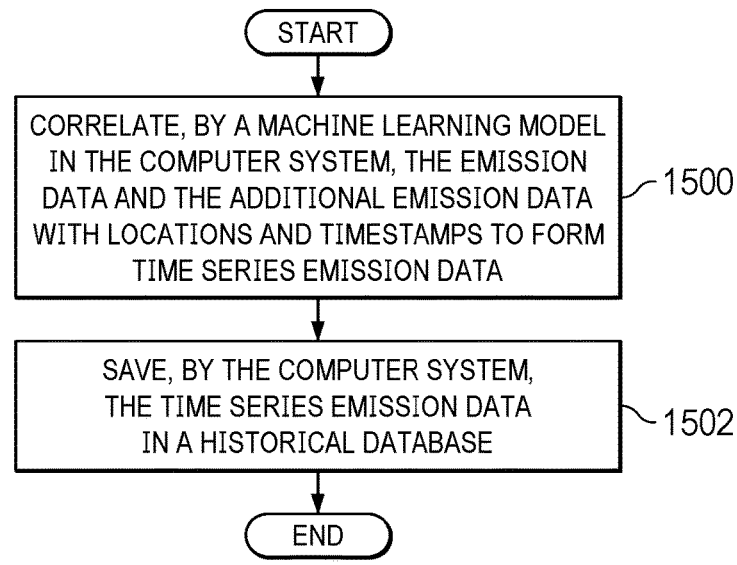
FIG. 15 is an illustration of a flowchart of a process for forming and saving time series emission data in accordance with an illustrative embodiment.

Turning next to FIG. 15, an illustration of a flowchart of a process for forming and saving time series emission data is depicted in accordance with an illustrative embodiment. The steps in this figure are examples of additional steps that can be used within the steps in the process in FIG. 6.

The process begins by correlating, by a machine learning model in the computer system, the emission data and the additional emission data with locations and timestamps to form time series emission data (step 1500). The process saves, by the computer system, the time series emission data in a historical database (step 1502). The process terminates thereafter.

Figure 16:
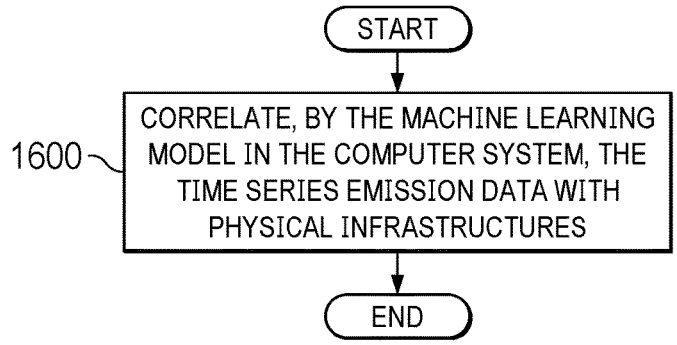
FIG. 16 is an illustration of a flowchart of a process for correlating time series emission data with physical infrastructures in accordance with an illustrative embodiment.

Turning to FIG. 16, an illustration of a flowchart of a process for correlating time series emission data with physical infrastructures is depicted in accordance with an illustrative embodiment. The step in this figure is an example of an additional step that can be used within the steps in the process in FIG. 6. The process correlates, by the machine learning model in the computer system, the time series emission data with physical infrastructures (step 1600). The process terminates thereafter.

Figure 17:
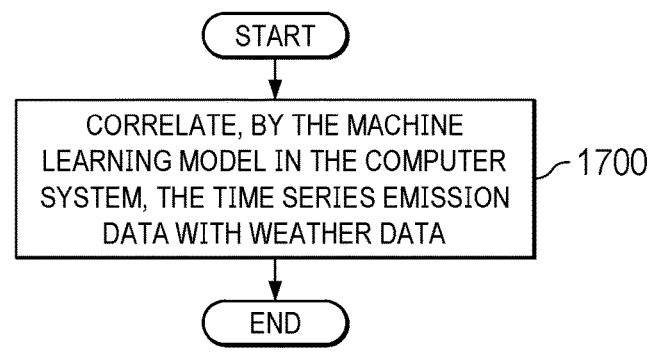
FIG. 17 is an illustration of a flowchart of a process for correlating time series emission data with weather data in accordance with an illustrative embodiment.

With reference to FIG. 17, an illustration of a flowchart of a process for correlating time series emission data with weather data is depicted in accordance with an illustrative embodiment. The step in this figure is an example of an additional step that can be used within the steps in the process in FIG. 6. The process correlates, by the machine learning model in the computer system, the time series emission data with weather data (step 1700). The process terminates thereafter.

Figure 18:
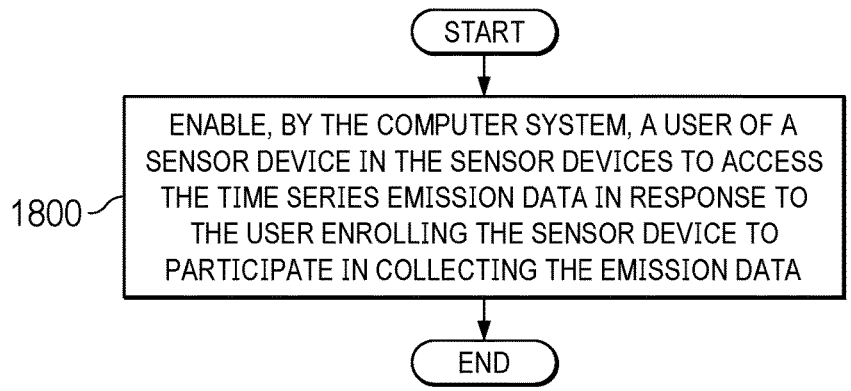
FIG. 18 is an illustration of a flowchart of a process for enabling a user of a sensor device to access time series emission data in accordance with an illustrative embodiment.

Turning next to FIG. 18, an illustration of a flowchart of a process for enabling a user of a sensor device to access time series emission data is depicted in accordance with an illustrative embodiment. The step in this figure is an example of an additional step that can be used within the steps in the process in FIG. 6. The process enables, by the computer system, a user of a sensor device in the sensor devices to access to the time series emission data in response to the user enrolling the sensor device to participate in collecting the emission data (step 1800). The process terminates thereafter.

Figure 19:
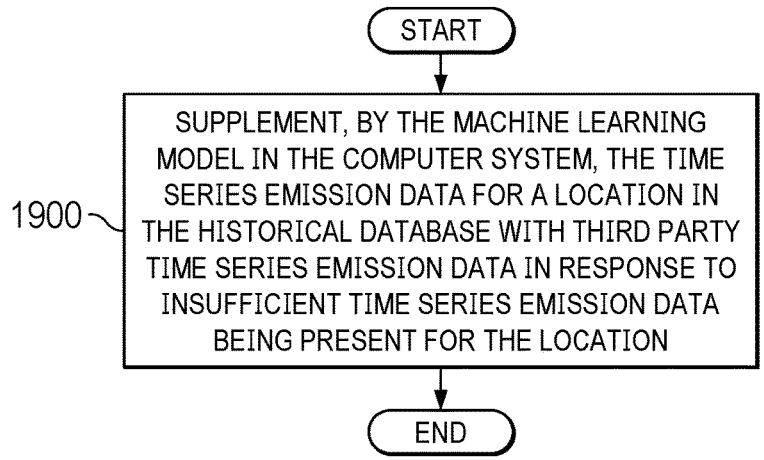
FIG. 19 is an illustration of a flowchart of a process for supplementing time series emission data with third party time series emission data in accordance with an illustrative embodiment.

Turning to FIG. 19, an illustration of a flowchart of a process for supplementing time series emission data with third party time series emission data is depicted in accordance with an illustrative embodiment. The step in this figure is an example of an additional step that can be used within the steps in the process in FIG. 6. The process supplements, by the machine learning model in the computer system, the time series emission data for a location in the historical database with third party time series emission data in response to insufficient time series emission data being present for the location (step 1900). The process terminates thereafter.

Figure 20:
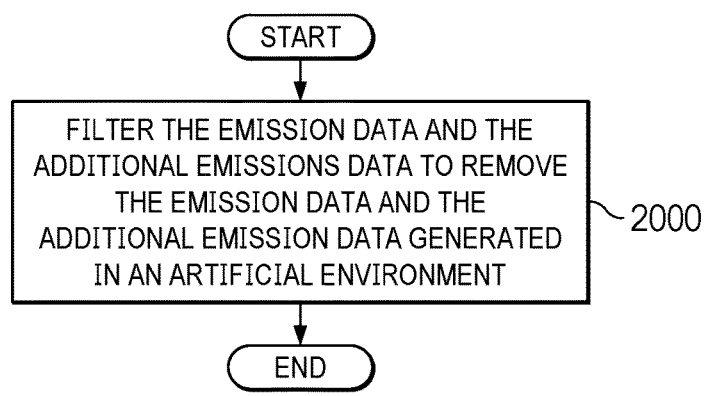
FIG. 20 is an illustration of a flowchart of a process for filtering emission data in accordance with an illustrative embodiment.

With reference to FIG. 20, an illustration of a flowchart of a process for filtering emission data is depicted in accordance with an illustrative embodiment. The step in this figure is an example of an additional step that can be used within the steps in the process in FIG. 6. The process filters the emission data and the additional emission data to remove the emission data and the additional emission data generated in an artificial environment (step 2000). The process terminates thereafter.

Figure 21:
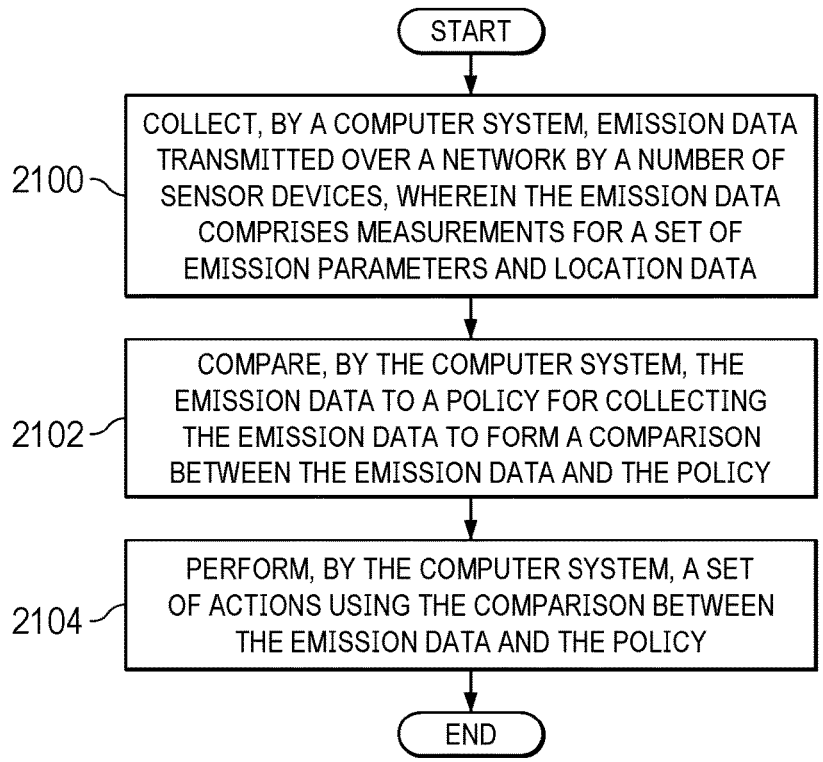
FIG. 21 is an illustration of a flowchart of a process for monitoring emission data to perform a set of actions in accordance with an illustrative embodiment.

Turning next to FIG. 21, an illustration of a flowchart of a process for monitoring emission data to perform a set of actions is depicted in accordance with an illustrative embodiment. The process illustrated in FIG. 21 can be implemented using data acquisition manager 140 in server computer 104 in FIG. 1 or data acquisition manager 210 in computer system 208 in FIG. 2.

The process begins by collecting, by a computer system, emission data transmitted over a network by a number of sensor devices, wherein the emission data comprises measurements for a set of emission parameters and location data (step 2100). The process compares, by the computer system, the emission data to a policy for collecting the emission data to form a comparison between the emission data and the policy (step 2102). The process performs, by the computer system, a set of actions using the comparison between the emission data and the policy (step 2104). The process terminates thereafter.

Figure 22:
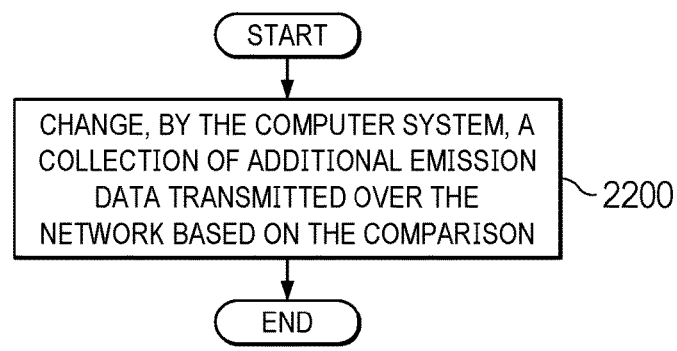
FIG. 22 is an illustration of a flowchart of a process for changing collection of additional emission data in accordance with an illustrative embodiment.

Turning to FIG. 22, an illustration of a flowchart of a process for changing collection of additional emission data is depicted in accordance with an illustrative embodiment. The process illustrated in FIG. 22 is an example of one implementation for step 2104 in FIG. 21. The process changes, by the computer system, a collection of additional emission data transmitted over the network based on the comparison (step 2200). The process terminates thereafter.

Figure 23:
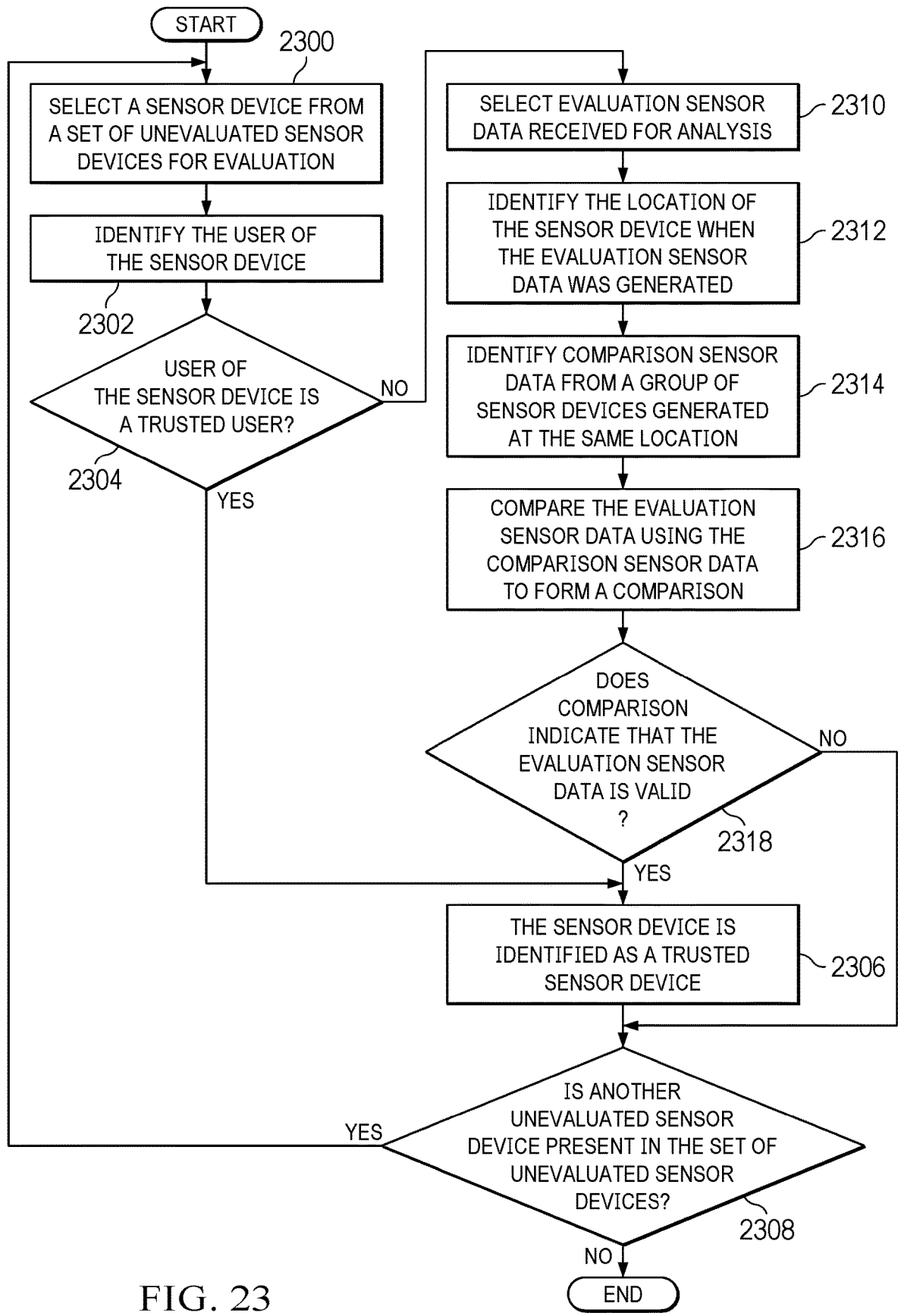
FIG. 23 is an illustration of a flowchart of a process for evaluating the trustworthiness of sensor devices in accordance with an illustrative embodiment.

Turning next to FIG. 23, a flowchart of a process for evaluating the trustworthiness of sensor devices is depicted in accordance with an illustrative embodiment. The process in FIG. 23 can be implemented in hardware, software, or both. When implemented in software, the process can take the form of program instructions that is executed by one of more processor units located in one or more hardware devices in one or more computer systems. For example, the process can be implemented in data acquisition manager 140 in server computer 104 in FIG. 1 or data acquisition manager 210 in computer system 208 in FIG. 2.

The process begins by selecting a sensor device from a set of unevaluated sensor devices for evaluation (step 2300). The process identifies the user of the sensor device (step 2302). In this illustrative example, the user can be identified from the user identifier embedded data received in sensor data from the sensor device being evaluated. In another illustrative example, a universal unique identifier (UUID) from identifier of the sensor device can be used to identify the user. The user can be assigned to identifier for the sensor device.

A determination is made as to whether the user of the sensor device is a trusted user (step 2304). A trusted user is a person, company, or other entity that has been verified as trustworthy for use in sending sensor data regarding emissions. In these illustrative examples, some users may have an incentive to send incorrect emissions to skew or change the analysis of the emissions made by a physical infrastructure.

If the user is a trusted user, the sensor device is identified as a trusted sensor device (step 2306). A determination is made as to whether another unevaluated sensor device is present in the set of unevaluated sensor devices (step 2308). If another unevaluated sensor devices present, the process returns to step 2300. Otherwise, the process terminates.

With reference again to step 2304, if the user cannot be identified as a trustworthy user, the process selects evaluation sensor data received for analysis (step 2310). The process identifies the location of the sensor device when the evaluation sensor data was generated (step 2312). The process identifies comparison sensor data from a group of sensor devices generated at the same location (step 2314).

The process compares the evaluation sensor data using the comparison sensor data to form a comparison (step 2316). The comparison in step 2316 can take a number of forms. For example, the comparison can be made using various statistical techniques to determine whether the evaluation sensor data is erroneous. In other illustrative examples, the evaluation sensor data in the comparison sensor data can be sent to machine learning model to determine whether the evaluation sensor data is erroneous.

A determination is made as to whether the comparison indicates that the evaluation sensor data is valid (step 2318). If the comparison indicates that the evaluation is valid, the process proceeds to step 2306. Otherwise, the process proceeds to step 2308.

Figure 24:
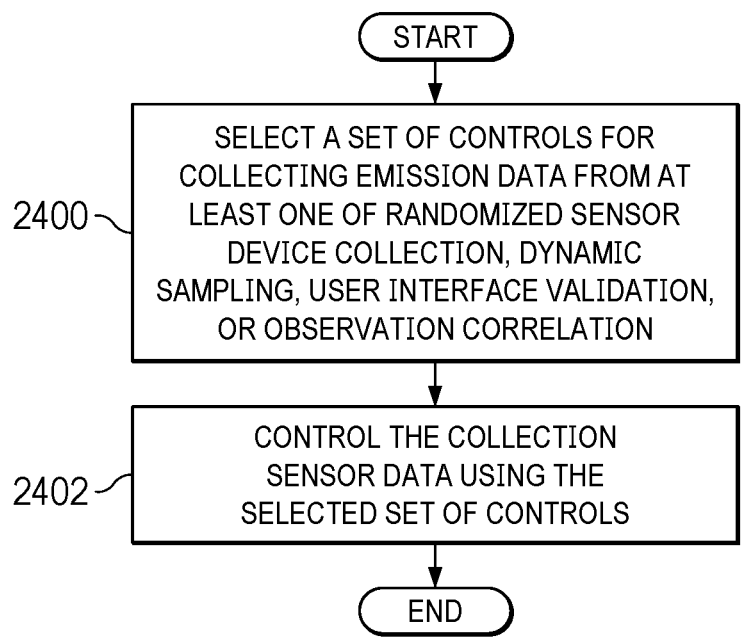
FIG. 24 is an illustration of a flowchart of a process for reducing erroneous submissions of sensor data in accordance with an illustrative embodiment.

With reference now to FIG. 24, an illustration of a flowchart of a process for reducing erroneous submissions of sensor data is depicted in accordance with an illustrative embodiment. The process in FIG. 24 can be implemented in hardware, software, or both. When implemented in software, the process can take the form of program instructions that is executed by one of more processor units located in one or more hardware devices in one or more computer systems. For example, the process can be implemented in data acquisition manager 140 in server computer 104 in FIG. 1 or data acquisition manager 210 in computer system 208 in FIG. 2.

The process begins by selecting a set of controls for collecting emission data from at least one of randomized sensor device collection, dynamic sampling, user interface validation, or observation correlation (step 2400). In step 2400, randomized device collection involves randomizing which submissions of sensor data from sensor devices are collected. Sensor data is for a number selected to be collected by the data acquisition manager.

With dynamic sampling, sampling rates can be dynamically changed. For example, the dynamic sampling rate can be increased from the perspective of sensor devices submitting sensor data. This increase in sampling rates can increase the complexity that a user can know which submissions of sensor data are useful.

In step 2400, user interface validation can involve users of sensor devices, such as mobile phones, being requested to validate that sensor data submissions are truthful. This user interface validation process can also show users erroneous data in an effort to reduce or remove users who submit erroneous sensor data. Observation correlation can involve correlating sensor data from different sensor devices within an area, historical trends, and other sources to remove erroneous sensor data.

The process controls the collection sensor data using the selected set of controls (step 2402). The process terminates thereafter.

Figure 25:
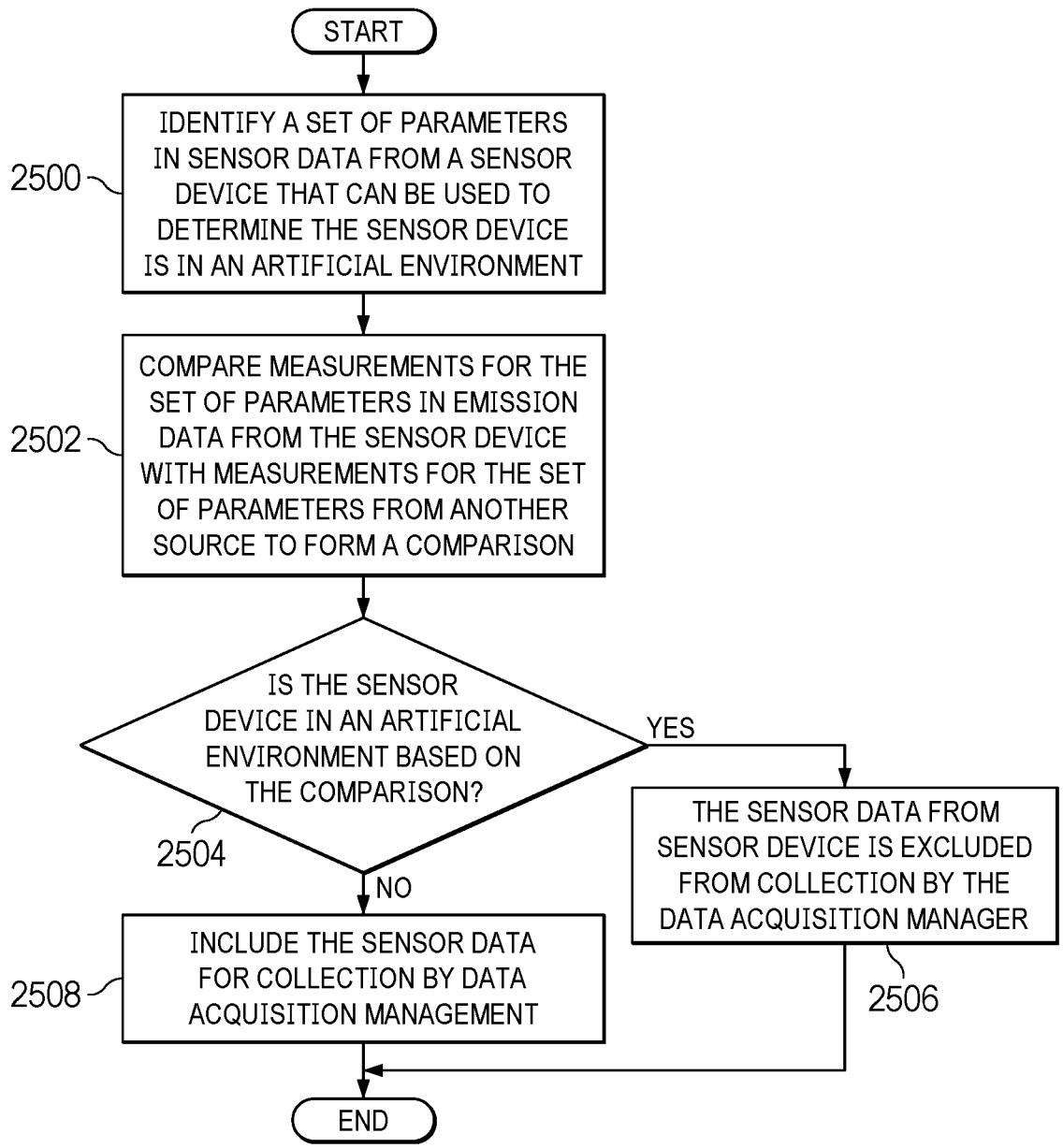
FIG. 25 is an illustration of a flowchart of a process for identifying sensor devices in desired environments in accordance with an illustrative embodiment.

Turning next to FIG. 25, an illustration of a flowchart of a process for identifying sensor devices in desired environments is depicted in accordance with an illustrative embodiment. The process in FIG. 25 can be implemented in hardware, software, or both. When implemented in software, the process can take the form of program instructions that is executed by one of more processor units located in one or more hardware devices in one or more computer systems. For example, the process can be implemented in data acquisition manager 140 in server computer 104 in FIG. 1 or data acquisition manager 210 in computer system 208 in FIG. 2.

The process begins by identifying a set of parameters in sensor data from a sensor device that can be used to determine the sensor device is in an artificial environment (step 2500). In this example, the artificial environment is an environment in which measurements of emissions are not desired. For example, the artificial environment can be present when a sensor device is located inside a briefcase, a purse, a container, a closet, a building, or some other object in which the measurement of emissions are not desired. In this example, the parameters can be selected as parameters for which data can be obtained from other sources. For example, the set of parameters can include at least one of a temperature, an ambient light, a humidity, a pressure, or other parameters that can be measured in a desired environment for which emissions are to be measured.

The process compares measurements for the set of parameters in emission data from the sensor device with measurements for the set of parameters from another source to form a comparison (step 2502). In step 2502, the other source can be, for example, a weather service, a sensor device known to be in a desired environment, or some other suitable source.

A determination is made as to whether the sensor device is in an artificial environment based in the comparison (step 2504). If the sensor device is an artificial environment, the sensor data from sensor device is excluded from collection by the data acquisition manager (step 2506). The process terminates thereafter. With reference again to step 2504, if the sensor device is in a desired environment, the process includes the sensor data for collection by data acquisition management (step 2508). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams may be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 26:
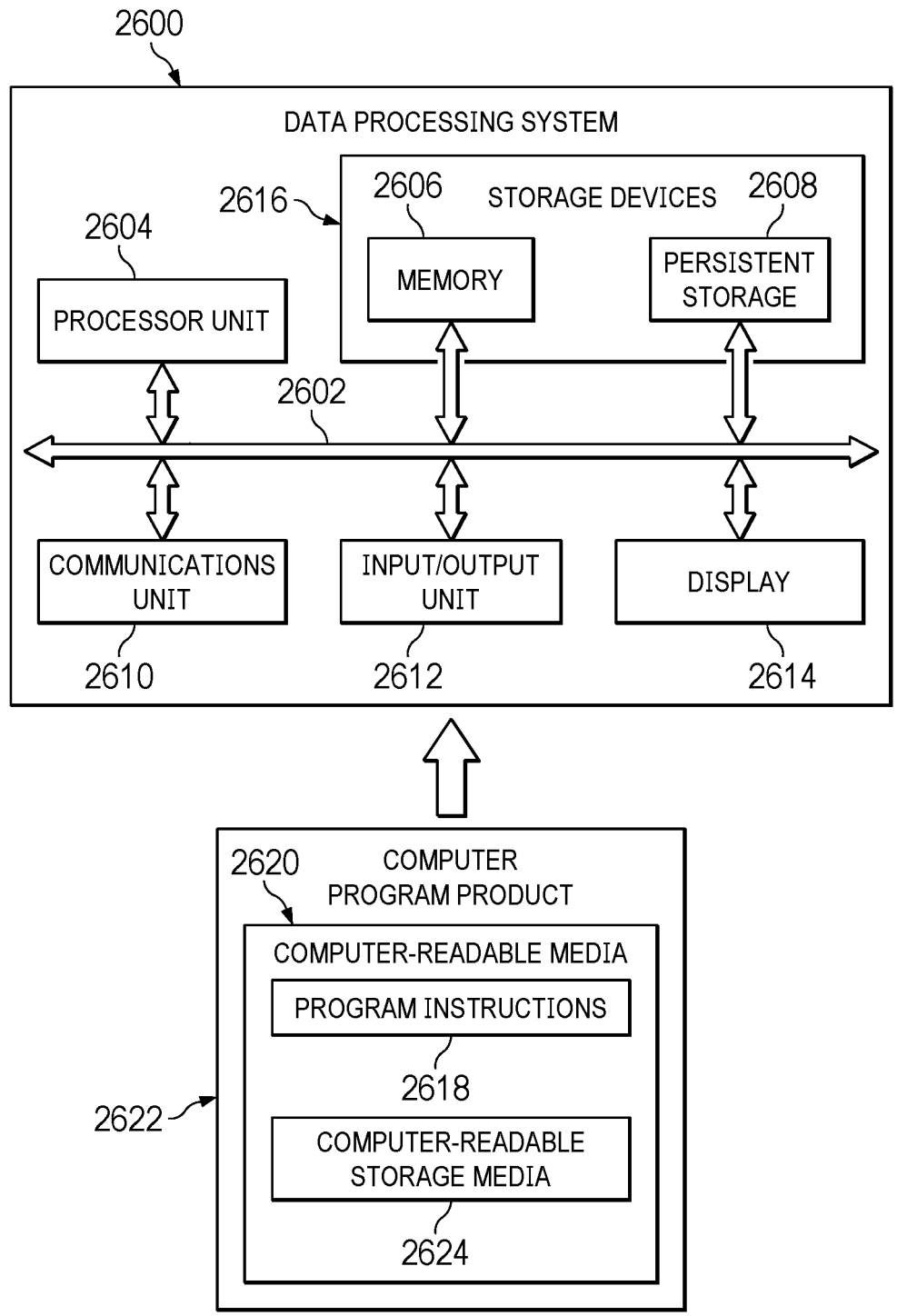
FIG. 26 is a block diagram of a data processing system in accordance with an illustrative embodiment.

Turning now to FIG. 26, a block diagram of a data processing system is depicted in accordance with an illustrative embodiment. Data processing system 2600 can be used to implement server computer 104, server computer 106, client devices 110, in FIG. 1. Data processing system 2600 can also be used to implement computer system 208, data processing system 229, and sensor devices 216 in FIG. 2. In this illustrative example, data processing system 2600 includes communications framework 2602, which provides communications between processor unit 2604, memory 2606, persistent storage 2608, communications unit 2610, input/output (I/O) unit 2612, and display 2614. In this example, communications framework 2602 takes the form of a bus system.

Processor unit 2604 serves to execute instructions for software that can be loaded into memory 2606. Processor unit 2604 includes one or more processors. For example, processor unit 2604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2604 can may be implemented using one or more heterogeneous processor systems in which a main processor is present with secondary processors on a single chip. As another illustrative example, processor unit 2604 can be a symmetric multi-processor system containing multiple processors of the same type on a single chip.

Memory 2606 and persistent storage 2608 are examples of storage devices 2616. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 2616 may also be referred to as computer-readable storage devices in these illustrative examples. Memory 2606, in these examples, can be, for example, a random-access memory or any other suitable volatile or non-volatile storage device. Persistent storage 2608 may take various forms, depending on the particular implementation.

For example, persistent storage 2608 may contain one or more components or devices. For example, persistent storage 2608 can be a hard drive, a solid-state drive (SSD), a flash memory, a rewritable optical disk, a rewritable magnetic tape, or some combination of the above. The media used by persistent storage 2608 also can be removable. For example, a removable hard drive can be used for persistent storage 2608.

Communications unit 2610, in these illustrative examples, provides for communications with other data processing systems or devices. In these illustrative examples, communications unit 2610 is a network interface card.

Input/output (I/O) unit 2612 allows for input and output of data with other devices that can be connected to data processing system 2600. For example, input/output (I/O) unit 2612 may provide a connection for user input through at least one of a keyboard, a mouse, or some other suitable input device. Further, input/output (I/O) unit 2612 may send output to a printer. Display 2614 provides a mechanism to display information to a user.

Instructions for at least one of the operating system, applications, or programs can be located in storage devices 2616, which are in communication with processor unit 2604 through communications framework 2602. The processes of the different embodiments can be performed by processor unit 2604 using computer-implemented instructions, which may be located in a memory, such as memory 2606.

These instructions are program instructions and are also referred to as program code, program instructions, computer usable program instructions, or computer-readable program instructions that can be read and executed by a processor in processor unit 2604. The program instructions in the different embodiments can be embodied on different physical or computer-readable storage media, such as memory 2606 or persistent storage 2608.

program instructions 2618 is located in a functional form on computer-readable media 2620 that is selectively removable and can be loaded onto or transferred to data processing system 2600 for execution by processor unit 2604. program instructions 2618 and computer-readable media 2620 form computer program product 2622 in these illustrative examples. In the illustrative example, computer-readable media 2620 is computer-readable storage medium 2624.

Computer-readable storage medium 2624 is a physical or tangible storage device used to store program instructions 2618 rather than a medium that propagates or transmits program instructions 2618. Computer-readable storage medium 2624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 2618 can be transferred to data processing system 2600 using a computer-readable signal media. The computer-readable signal media are signals and can be, for example, a propagated data signal containing program instructions 2618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2620" can be singular or plural. For example, program instructions 2618 can be located in computer-readable media 2620 in the form of a single storage device or system. In another example, program instructions 2618 can be located in computer-readable media 2620 that is distributed in multiple data processing systems. In other words, some instructions in program instructions 2618 can be located in one data processing system while other instructions in program instructions 2618 can be located in one data processing system. For example, a portion of program instructions 2618 can be located in computer-readable media 2620 in a server computer while another portion of program instructions 2618 can be located in computer-readable media 2620 located in a set of client computers.

The different components illustrated for data processing system 2600 are not meant to provide architectural limitations to the manner in which different embodiments can be implemented. The different illustrative embodiments can be implemented in a data processing system including components in addition to or in place of those illustrated for data processing system 2600. Other components shown in FIG. 26 can be varied from the illustrative examples shown. The different embodiments can be implemented using any hardware device or system capable of running program instructions 2618.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, memory 2606, or portions thereof, may be incorporated in processor unit 2604 in some illustrative examples.

Thus, the illustrative examples provide a method, apparatus, system, and computer program product for monitoring emission data. In the illustrative examples, a computer system collects emission data transmitted over a network by a number of sensor devices, wherein the emission data comprises measurements for a set of emission parameters and location data. This emission data is compared to a policy for collecting the emission data to form a comparison between the emission data and the policy. A set of actions is performed using the comparison between the emission data and the policy.

In the illustrative examples, emission data can be collected in a dynamic and adaptive manner based on an analysis of the emission data that is collected. In this manner, the use of network resources can be reduced by collecting less emission data that is needed for a particular environmental condition. By collecting less emission data, some sensor devices can conserve battery power or be available to perform other functions or actions. Further, at least one of a reduction in network resources or in sensor device resources can occur.

Additionally, when sensor data is received from all of the sensor devices, only some of the emission data received may need to be processed. In this example, only some of the sensor data received is "collected" for processing. Thresholds can be used to determine when additional sensor data should be processed. As result, the amount of emission data processed can be reduced. This type of emission data collection can reduce the use of processing resources in a computer system that collects and processes emission data.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for monitoring emission data transmitted over a network, the method comprising:
   collecting, by a computer system, emission data received from sensor devices over the network,
   comparing, by the computer system, the emission data to a set of thresholds for the emission data to form a comparison between the emission data and the set of thresholds;
   changing, by the computer system, a collection of additional emission data from a number of sensor devices within same area of the sensor devices over the network based on the comparison between the emission data and the set of thresholds, wherein the number of sensor devices comprises the sensor devices over the network and other sensor devices within same area of the sensor devices based on location of the sensor devices;

correlating, by a machine learning model in the computer system, the emission data and the additional emission data with locations and timestamps to form time series emission data;

saving, by the computer system, the time series emission data in a historical database; and correlating, by the machine learning model in the computer system, the time series emission data with physical infrastructures.

2. The method of claim 1, wherein collecting, by the computer system, the emission data received from the sensor devices over the network comprises:

collecting, by the computer system, the emission data received from randomly selected sensor devices in the sensor devices.

3. The method of claim 1, wherein collecting, by the computer system, the emission data received from the sensor devices over the network comprises:

collecting, by the computer system, the emission data received from trusted sensor devices in the sensor devices.

4. The method of claim 1, wherein the sensor devices is a subset of all sensor devices sending the emission data over the network.

5. The method of claim 1, wherein comparing, by the computer system, the emission data to the set of thresholds for the emission data to form the comparison between the emission data and the set of thresholds comprises:

comparing, by the computer system, at least a portion of the emission data to the set of thresholds for the emission data to form the comparison between the emission data and the set of thresholds.

6. The method of claim 1, wherein changing, by the computer system, the collection of the additional emission data from the sensor devices over the network based on the comparison between the emission data and the set of thresholds comprises:

changing, by the computer system, the collection of the additional emission data from the sensor devices over the network based on the comparison between the emission data and the set of thresholds changing the emission data collected from the sensor devices in response to the emission data crossing of at least one of the set of thresholds.

7. The method of claim 1, wherein changing, by the computer system, the collection of the additional emission data from the sensor devices over the network based on the comparison between the emission data and the set of thresholds comprises:

collecting, by the computer system, the additional emission data at a higher frequency.

8. The method of claim 1, wherein changing, by the computer system, the collection of the additional emission data from the sensor devices over the network based on the comparison between the emission data and the set of thresholds comprises:

collecting, by the computer system, a larger amount of data for the additional emission data when making measurements of emissions.

9. The method of claim 1, wherein the emission data is collected from a first number of the sensor devices in a location and wherein changing, by the computer system, the collection of additional emission data from the sensor devices over the network based on the comparison between the emission data and the set of thresholds comprises:

collecting, by the computer system, the additional emission data from a second set of the sensor devices in the location.

10. The method of claim 1 further comprising:

comparing, by the computer system, a parameter in the emission data from a location to an alert threshold; and sending, by the computer system, an alert to a client in response to a measurement for the parameter crossing the alert threshold.

11. The method of claim 1 further comprising:

correlating, by the machine learning model in the computer system, the time series emission data with weather data.

12. The method of claim 1 further comprising:

enabling, by the computer system, a user of a sensor device in the sensor devices to access to the time series emission data in response to the user enrolling the sensor device to participate in collecting the emission data.

13. The method of claim 1 further comprising:

supplementing, by the machine learning model in the computer system, the time series emission data for a location in the historical database with third party time series emission data in response to insufficient time series emission data being present for the location.

14. The method of claim 13, wherein the third party time series emission data is obtained from at least one of satellite images or emission data from third party sensor devices.

15. The method of claim 1 further comprising:

filtering the emission data and the additional emission data to remove the emission data and the additional emission data generated in an artificial environment.

16. The method of claim 1, wherein the set of emission parameters is selected from at least one of a volatile organic compound, carbon monoxide, carbon dioxide, methane, a particulate, a temperature, a pressure, or ambient light.

17. The method of claim 1, wherein the emission data include metadata selected from at least one of a location, a timestamp, a software version, a hardware version, a device identifier.

18. A method for monitoring emission data, the method comprising:

collecting, by a computer system, emission data transmitted over a network by a number of sensor devices, wherein the emission data comprises measurements for a set of emission parameters and location data;

comparing, by the computer system, the emission data to a policy for collecting the emission data to form a comparison between the emission data and the policy;

performing, by the computer system, a set of actions to sensor devices within same area of the number of sensor devices using the comparison between the emission data and the policy for changing a collection of additional emission data from the sensor devices within same area, wherein the sensor devices within same area of the number of sensor devices comprise the number of sensor devices and other sensor devices within same area of the number of sensor devices based on location for the number of sensor devices;

correlating, by a machine learning model in the computer system, the emission data and the additional emission data with locations and timestamps to form time series emission data;

saving, by the computer system, the time series emission data in a historical database; and correlating, by the machine learning model in the computer system, the time series emission data with physical infrastructures.

19. The method of claim 18, wherein performing, by the computer system, the set of actions using the comparison between the emission data and the policy comprises:
changing, by the computer system, a collection of additional emission data transmitted over the network based on the comparison.

20. The method of claim 18, wherein the policy comprises a set of rules for emission data and thresholds used to apply the rules.

21. The method of claim 18, wherein the set of actions is selected from at least one of collecting additional emission data at a higher frequency, collecting a larger amount of data for the additional emission data when making the measurements of emissions, or collecting the additional emission data from a second set of the sensor devices in the location, wherein the emission data was collected by a first number of the sensor devices.

22. An emission data collection system comprising:
a computer system; and
a data acquisition manager in the computer system, wherein the data acquisition manager is configured to:
collect emission data received from sensor devices over a network;
compare the emission data to a set of thresholds for the emission data to form a comparison between the emission data and the set of thresholds;
change a collection of additional emission data from a number of sensor devices within same area of the sensor devices over the network based on the comparison between the emission data and the set of thresholds, wherein the number of sensor devices comprises the sensor devices over the network and other sensor devices within same area of the sensor devices based on location of the sensor devices;
correlate the emission data and the additional emission data with locations and timestamps to form time series emission data using a machine learning model;
save the time series emission data in a historical database; and
correlating the time series emission data with physical infrastructures using the machine learning model.

23. The emission data collection system of claim 22, wherein in collecting the emission data received from the sensor devices over the network, the data acquisition manager is configured to:
collect the emission data received from randomly selected sensor devices in the sensor devices.

24. The emission data collection system of claim 22, wherein in collecting the emission data received from the sensor devices over the network, the data acquisition manager is configured to:
collect the emission data received from trusted sensor devices in the sensor devices.

25. The emission data collection system of claim 22, wherein in comparing the emission data to the set of thresholds for the emission data to form the comparison between the emission data and the set of thresholds, the data acquisition manager is configured to:
compare at least a portion of the emission data to the set of thresholds for the emission data to form the comparison between the emission data and the set of thresholds.

26. The emission data collection system of claim 22, wherein in changing the collection of the additional emission data from the sensor devices over the network based on the comparison between the emission data and the set of thresholds, the data acquisition manager is configured to:
change the collection of the additional emission data from the sensor devices over the network based on the comparison between the emission data and the set of thresholds changing the emission data collected from the sensor devices in response to the emission data crossing of at least one of the set of thresholds.

27. The emission data collection system of claim 22, wherein in changing, by the computer system, the collection of the additional emission data from the sensor devices over the network based on the comparison between the emission data and the set of thresholds comprises:
collect the additional emission data at a higher frequency.

28. The emission data collection system of claim 22, wherein in changing the collection of the additional emission data from the sensor devices over the network based on the comparison between the emission data and the set of thresholds, the data acquisition manager is configured to:
collect a larger amount of data for the additional emission data when making the measurements of emissions.

29. The emission data collection system of claim 22, wherein the emission data is collected from a first number of the sensor devices in a location and wherein in changing the collection of additional emission data from the sensor devices over the network based on the comparison between the emission data and the set of thresholds, the data acquisition manager is configured to:
collect the additional emission data from a second set of the sensor devices in the location.

30. The emission data collection system of claim 22, wherein the data acquisition manager is configured to:
compare a parameter in the emission data from a location to an alert threshold; and
send an alert to a client in response to a measurement for the parameter crossing the alert threshold.

31. The emission data collection system of claim 22, wherein the data acquisition manager is configured to:
correlate, by the machine learning model, the time series emission data with weather data.

32. The emission data collection system of claim 22, wherein the data acquisition manager is configured to:
enable a user of a sensor device in the sensor devices to access to the time series emission data in response to the user enrolling the sensor device to participate in collecting the emission data.

33. The emission data collection system of claim 22, wherein the data acquisition manager is configured to:
supplement, by the machine learning model in the computer system, the time series emission data for a location in the historical database with third party time series emission data in response to insufficient time series emission data being present for the location.

34. The emission data collection system of claim 33, wherein the third party time series emission data is obtained from at least one of satellite images or emission data from third party sensor devices.

35. The emission data collection system of claim 22, wherein the data acquisition manager is configured to:
filter the emission data and the additional emission data to remove the emission data and the additional emission data generated in an artificial environment.

36. The emission data collection system of claim 22, wherein the set of emission parameters is selected from at least one of a volatile organic compound, carbon monoxide, carbon dioxide, methane, a particulate, a temperature, a pressure, or ambient light.

37. The emission data collection system of claim 22, wherein the emission data include metadata selected from at least one of a location, a timestamp, a software version, a hardware version, a device identifier.

38. An emission data collection system comprising:
   a computer system; and
   a data acquisition manager in the computer system, wherein the data acquisition manager is configured to:
      collect emission data transmitted from a number of sensor devices over a network, wherein the emission data comprises measurements for a set of emission parameters and locations;
      compare the emission data collected to a policy for collecting the emission data to form a comparison between the emission data and the policy;
      perform a set of actions to sensor devices within same area of the number of sensor devices using the comparison between the emission data, locations for the number of sensor devices and the policy for changing a collection of additional emission data from the sensor devices within same area, wherein the sensor devices within same area of the number of sensor devices comprises the number of sensor devices and other sensor devices within same area of the number of sensor devices;
      correlate the emission data and the additional emission data with locations and timestamps to form time series emission data using a machine learning model;
      save the time series emission data in a historical database; and
      correlate the time series emission data with physical infrastructures using the machine learning model.

39. A computer program product for monitoring emission data, the computer program product comprising a computer readable storage medium having program instructions embodied therewith, the program instructions executable by a computer system to cause the computer system to perform a method of:
   collecting, by a computer system, emission data received from sensor devices over a network;
   comparing, by the computer system, the emission data to a set of thresholds for the emission data to form a comparison between the emission data and the set of thresholds;
   changing, by the computer system, a collection of additional emission data from a number of sensor devices within same area of the sensor devices over the network based on the comparison between the emission data and the set of thresholds, wherein the number of sensor devices comprises the sensor devices over the network and other sensor devices within same area of the sensor devices based on location of the sensor devices;
   correlating, by a machine learning model in the computer system, the emission data and the additional emission data with locations and timestamps to form time series emission data;
   saying, by the computer system, the time series emission data in a historical database; and
   correlating, by the machine learning model in the computer system, the time series emission data with physical infrastructures.

40. A computer program product for monitoring emission data, the computer program product comprising a computer readable storage medium having program instructions embodied therewith, the program instructions executable by a computer system to cause the computer system to perform a method of:
   collecting, by a computer system, emission data transmitted over a network by a number of sensor devices, wherein the emission data comprises measurements for a set of emission parameters and location data;
   comparing, by the computer system, the emission data to a policy for collecting the emission data to form a comparison between the emission data and the policy;
   performing, by the computer system, a set of actions to sensor devices within same area of the number of sensor devices using the comparison between the emission data, locations for the number of sensor devices and the policy for changing a collection of additional emission data from the sensor devices within same area, wherein the sensor devices within same area of the number of sensor devices comprises the number of sensor devices and other sensor devices within same area of the number of sensor devices;
   correlate the emission data and the additional emission data with locations and timestamps to form time series emission data using a machine learning model;
   save the time series emission data in a historical database; and
   correlate the time series emission data with physical infrastructures using the machine learning model.

* * * * *